US010884011B2

(12) United States Patent
Steinbrunner et al.

(10) Patent No.: US 10,884,011 B2
(45) Date of Patent: Jan. 5, 2021

(54) WHEEL ASSEMBLY WITH SENSOR FOR MEASURING WHEEL MOVEMENT

(71) Applicant: Crown Equipment Corporation, New Bremen, OH (US)

(72) Inventors: Cole T. Steinbrunner, New Bremen, OH (US); Donald T. Meiring, Osgood, OH (US); Nicholas R. Rose, Coldwater, OH (US); John H. Hinders, Sidney, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 16/438,587

(22) Filed: Jun. 12, 2019

(65) Prior Publication Data

US 2019/0383846 A1 Dec. 19, 2019

Related U.S. Application Data

(60) Provisional application No. 62/686,196, filed on Jun. 18, 2018.

(51) Int. Cl.
*G01P 3/44* (2006.01)
*G01P 3/488* (2006.01)
(Continued)

(52) U.S. Cl.
CPC ............ *G01P 3/443* (2013.01); *B66F 17/003* (2013.01); *B60G 2204/115* (2013.01); *G01P 3/487* (2013.01); *G01P 3/488* (2013.01)

(58) Field of Classification Search
CPC .......... G01P 3/443; G01P 3/488; G01P 3/487; B66F 17/003
See application file for complete search history.

(56) References Cited

U.S. PATENT DOCUMENTS 3,716,787 A * 2/1973 Hammond .............. G01P 3/488
324/173
4,864,231 A * 9/1989 Okumura ............ B60B 27/0005
324/173
(Continued)

FOREIGN PATENT DOCUMENTS

AU 2004237817 B2 12/2011
DE 102017121051 A1 3/2018
WO 2013157999 A1 10/2013

OTHER PUBLICATIONS

Delaney, Brigid; Invitation to Pay Additional Fees, Partial International Search, and Provisional Opinion; International Application No. PCT/US2019/036670; dated Aug. 22, 2019; European Patent Office, Rijswijk, Netherlands.

(Continued)

*Primary Examiner* — Helen C Kwok
(74) *Attorney, Agent, or Firm* — Stevens & Showalter LLP

(57) ABSTRACT

A wheel assembly including a sensor for measuring wheel movement is provided comprising: a frame member; an axle fixed to the frame member; a wheel rotatably mounted to the axle and comprising a wheel recess; a code ring located within the wheel recess for rotation with the wheel; and a sensor device coupled to the frame member and located adjacent to the code ring. The sensor device senses movement of the code ring and generates an output signal indicative of the wheel movement. A materials handling vehicle comprising the wheel assembly is also provided.

24 Claims, 15 Drawing Sheets

(51) Int. Cl.
  *G01P 3/487* (2006.01)
  *B66F 17/00* (2006.01)

(56) References Cited

U.S. PATENT DOCUMENTS

| | | | | |
|---|---|---|---|---|
| 6,199,665 | B1* | 3/2001 | Eilerman | B66F 9/07513 |
| | | | | 187/231 |
| 7,350,976 | B2* | 4/2008 | Ohtsuki | B60B 27/00 |
| | | | | 384/448 |
| 7,592,798 | B2* | 9/2009 | Yabe | F16C 19/186 |
| | | | | 324/174 |
| 9,658,099 | B2* | 5/2017 | Hammerl | G01G 9/00 |
| 2003/0059139 | A1* | 3/2003 | Nakajima | F16C 41/007 |
| | | | | 384/448 |
| 2003/0122539 | A1* | 7/2003 | Heimann, Jr. | G01P 3/443 |
| | | | | 324/173 |
| 2004/0226762 | A1* | 11/2004 | Huther | G01P 3/488 |
| | | | | 180/65.1 |
| 2008/0308359 | A1* | 12/2008 | Waltz | B66F 9/07545 |
| | | | | 187/222 |
| 2013/0073140 | A1* | 3/2013 | Dunst | G07C 5/085 |
| | | | | 701/32.7 |
| 2018/0072096 | A1* | 3/2018 | Shahana | G01P 3/481 |

OTHER PUBLICATIONS

Christoph Felicetti; International Search Report and Written Opinion; International Application No. PCT/US2019/036670; dated Oct. 14, 2019; European Patent Office; Rijswijk, Netherlands.

Cole T. Steinbrunner et al.; Related U.S. Appl. No. 17/098,883; filed Nov. 16, 2020 entitled Wheel Assembly With Sensor For Measuring Wheel Movement.

* cited by examiner

WHEEL ASSEMBLY WITH SENSOR FOR MEASURING WHEEL MOVEMENT

CROSS-REFERENCE TO RELATED APPLICATIONS

This application claims the benefit of U.S. Provisional Application No. 62/686,196, filed Jun. 18, 2018, which is hereby incorporated by reference in its entirety.

FIELD OF THE INVENTION

The present invention relates to determining movement of an industrial vehicle and, more specifically, to determining movement of the industrial vehicle based on movement of a wheel in an outrigger arm assembly.

BACKGROUND OF THE INVENTION

Forklifts and other types of industrial vehicles operate in a variety of different conditions and settings. These vehicles typically include one or more sensors associated with a drive or traction motor for generating signals indicative of a speed, acceleration, and direction of motion of the traction motor, which is used to determine the speed, acceleration, and direction of motion of a driven wheel and thus the vehicle.

SUMMARY OF THE INVENTION

Various aspects and embodiments of the present disclosure address various technical problems associated with the need for a sensor device that accurately detects a rotational speed of a wheel in an outrigger arm assembly yet allows components that wear out quickly to be repaired or replaced without replacing the sensor device. The present disclosure provides a first technical solution that involves directly monitoring a wheel speed, such as a wheel that is not driven and, hence, unlikely to slip, such that inconsistent rotation or slippage of an axle relative to the wheel bearings or slippage of a driven wheel with respect to a floor surface does not affect the accuracy of a vehicle speed calculation based on the measured non-driven wheel speed. Because the wheel speed is directly monitored, and because the wheel is non-driven, the wheel is unlikely to slip and, hence, the sensor device provides wheel speed information that allows vehicle speed to be accurately determined. Another technical solution provided herein is the use of one or more Hall-effect sensors, which, in combination with a magnetic target (e.g., a code ring), are much more sensitive and are typically effective over a much wider air gap range, as compared to, for example, an inductive proximity sensor or a back biased Hall sensor. Hence, the presently disclosed sensor device is less likely to be affected by variability in the air gap and need not conform to the tight tolerances and precise machining typically required by conventional sensor devices. A further technical solution involves placement of the sensor device such that frequently-replaced components of the outrigger arm assembly, e.g., the wheel bearings, wheels/wheel covers, and/or axles, may be repaired or replaced without disturbing or replacing the sensor device. The attachment and location of the sensor device also allows the sensor device to be easily accessed without the need to disassemble and reassemble the outrigger arm assembly, and many of the operations related to accessing the sensor may be performed by hand. The sensor device is relatively small, and lightweight, as compared to conventional sensors associated with complex bearing assemblies, and may be easily retrofitted onto existing vehicles. Other technical problems and corresponding solutions are set out herein.

In accordance with an aspect of the present disclosure, a wheel assembly including a sensor for measuring wheel movement is provided. The wheel assembly comprises a frame member; an axle fixed to the frame member; a wheel rotatably mounted to the axle, wherein the wheel comprises a wheel recess; a code ring located within the wheel recess for rotation with the wheel; and a sensor device coupled to the frame member and located adjacent to the code ring, in which the sensor device senses movement of the code ring and generates an output signal indicative of the wheel movement.

The code ring may comprise a ring magnetized with alternating north and south poles around a perimeter of the ring. In some examples, the sensor device may comprise at least one Hall-effect sensor for sensing the alternating north and south poles as the code ring rotates and, based on sensing the alternating north and south poles, generating a corresponding output signal. In some particular examples, the sensor device may comprise first and second Hall-effect sensors that generate first and second output signals that are 90 degrees out of phase with one another.

The frame member may comprise opposing axle plates for supporting the axle. In some examples, each of the opposing axle plates may comprise a bore for receiving the axle. In some particular examples, one of the opposing axle plates may comprise a further bore through which a portion of the sensor device extends. In some configurations, the portion of the sensor device may extend completely through a thickness of the one axle plate and be aligned with the code ring. In other particular examples, the sensor device may comprise a housing with a housing bore extending through the housing and a fastener that extends through the housing bore and engages a tapped bore in the one axle plate.

In some particular configurations, the wheel assembly may further comprise a side member that is coupled to the one axle plate and receives the sensor device. In some examples, the wheel assembly may further comprise a cover plate coupled to an outer surface of the side member. In other examples, the wheel assembly may further comprise a cable guide member extending between the frame member and a support structure.

In other particular configurations, the wheel assembly may further comprise a first side member coupled to the one axle plate; a second side member coupled to a support structure and located adjacent to the first side member; a first cover plate coupled to an outer surface of the first side member; and a second cover plate coupled to an outer surface of the second side member, in which the first side member receives the sensor device and a cable extending from the sensor device and the second side member receives the cable extending from the first side member. In some examples, the second side member may comprise one or more apertures extending through a thickness of the second side member and one or more fasteners that extend through the apertures and engage one or more corresponding bores formed in one of an outer surface or a sidewall of the support structure. In some particular examples, the one or more apertures may serve as a drill guide for forming the one or more corresponding bores in the support structure.

The frame member of the wheel assembly may comprise opposing axle plates, in which each of the opposing axle plates comprises a bore for receiving the axle. The sensor device may be coupled to one of the opposing axle plates, in which the one axle plate comprises a further bore through which a portion of the sensor device extends. The sensor device may comprise a housing with a housing bore extending through the housing and a fastener that extends through the housing bore and engages an additional bore in the one axle plate. The side member may further comprise one or more auxiliary bores that serve as a drill guide for forming one or more of the further bores or the additional bore.

In accordance with an aspect of the present disclosure, a materials handling vehicle is provided that comprises a power unit; a mast assembly secured to the power unit; a pair of forks coupled to the mast assembly, the forks being movable in height between a lowered position and a plurality of raised positions; and a pair of outrigger arm assemblies secured to the mast assembly. Each outrigger arm assembly comprises a frame member secured to the mast assembly; an axle fixed to the frame member; a wheel rotatably mounted to the axle, in which the wheel comprises a wheel recess; a code ring located within the wheel recess for rotation with the wheel; and a sensor device coupled to the frame member and located adjacent to the code ring, in which the sensor device senses movement of the code ring and generates an output signal indicative of movement of the wheel.

The code ring may comprise a ring magnetized with alternating north and south poles around a perimeter of the ring. In some examples, the sensor device may comprise at least one Hall-effect sensor for sensing the alternating north and south poles as the code ring rotates and, based on sensing the alternating north and south poles, generating a corresponding output signal. In some particular examples, the sensor device may comprise first and second Hall-effect sensors that generate first and second output signals that are 90 degrees out of phase with one another.

The frame member may comprise opposing axle plates for supporting the axle. In some examples, each of the opposing axle plates may comprise a bore for receiving the axle. In some particular examples, one of the opposing axle plates may comprise a further bore through which a portion of the sensor device extends. In some configurations, the portion of the sensor device may extend completely through a thickness of the one axle plate and be aligned with the code ring. In other particular examples, the sensor device may comprise a housing with a housing bore extending through the housing and a fastener that extends through the housing bore and engages a tapped bore in the one axle plate.

In some particular configurations, the materials handling vehicle may further comprise a side member that is coupled to the one axle plate and receives the sensor device. In some examples, a cover plate may be coupled to an outer surface of the side member. In other examples, a cable guide member may extend between the frame member and a support structure.

In other particular configurations, the materials handling vehicle may further comprise a first side member coupled to the one axle plate; a second side member coupled to a support structure and located adjacent to the first side member; a first cover plate coupled to an outer surface of the first side member; and a second cover plate coupled to an outer surface of the second side member, in which the first side member receives the sensor device and a cable extending from the sensor device and the second side member receives the cable extending from the first side member. In some examples, the second side member may comprise one or more apertures extending through a thickness of the second side member and one or more fasteners that extend through the apertures and engage one or more corresponding bores formed in one of an outer surface or a sidewall of the support structure. In some particular examples, the one or more apertures may serve as a drill guide for forming the one or more corresponding bores in the support structure.

The frame member of the wheel assembly may comprise opposing axle plates, in which each of the opposing axle plates comprises a bore for receiving the axle. The sensor device may be coupled to one of the opposing axle plates, in which the one axle plate comprises a further bore through which a portion of the sensor device extends. The sensor device may comprise a housing with a housing bore extending through the housing and a fastener that extends through the housing bore and engages an additional bore in the one axle plate. The side member may further comprise one or more auxiliary bores that serve as a drill guide for forming one or more of the further bores or the additional bore.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 6 is a front view of a code ring, in accordance with principles of the present disclosure;

FIG. 8 is a cross-sectional view taken along line 8-8 in FIG. 7;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
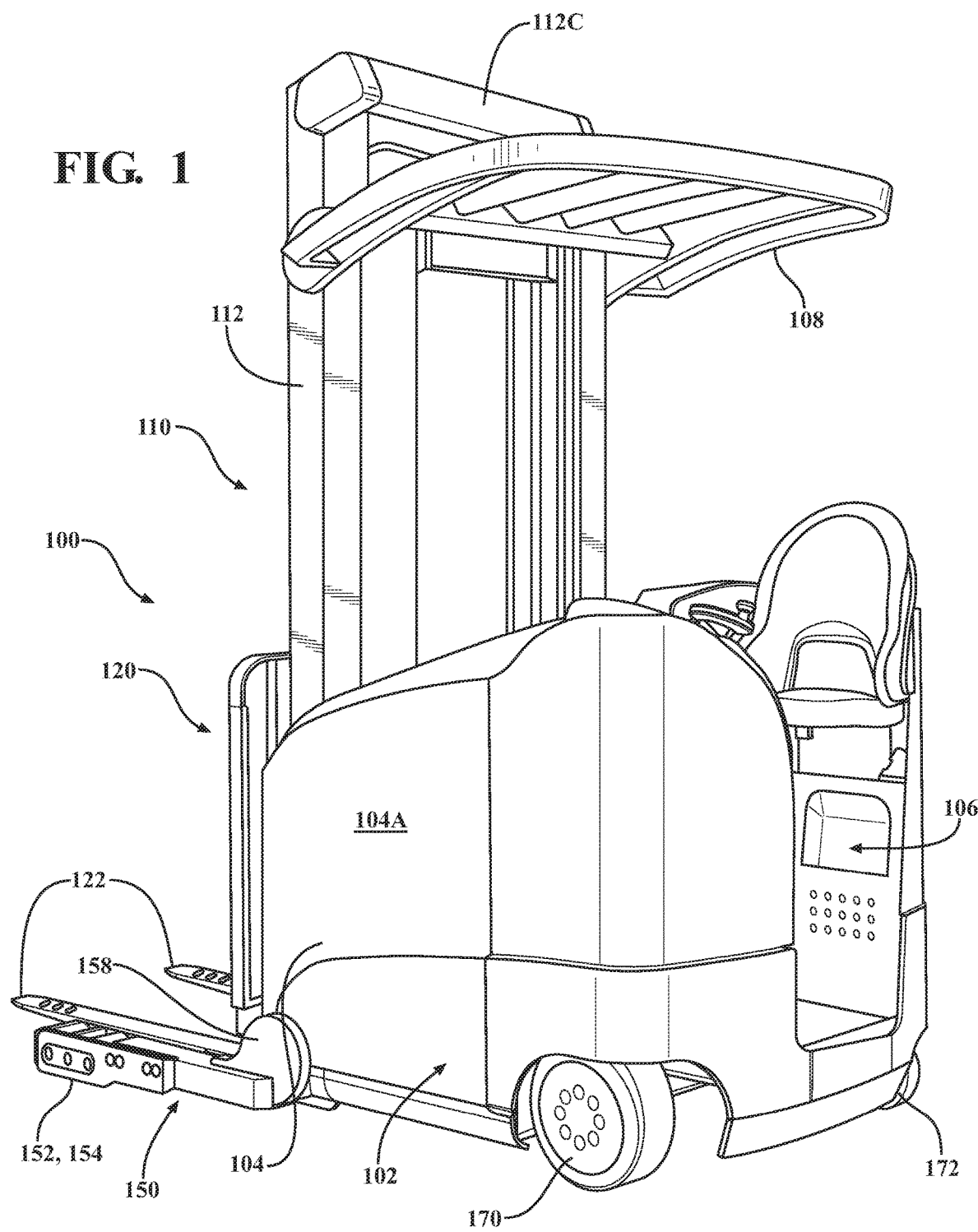
FIG. 1 is a perspective view of an industrial vehicle in the form of a reach truck, in accordance with principles of the present disclosure.
Figure 2:
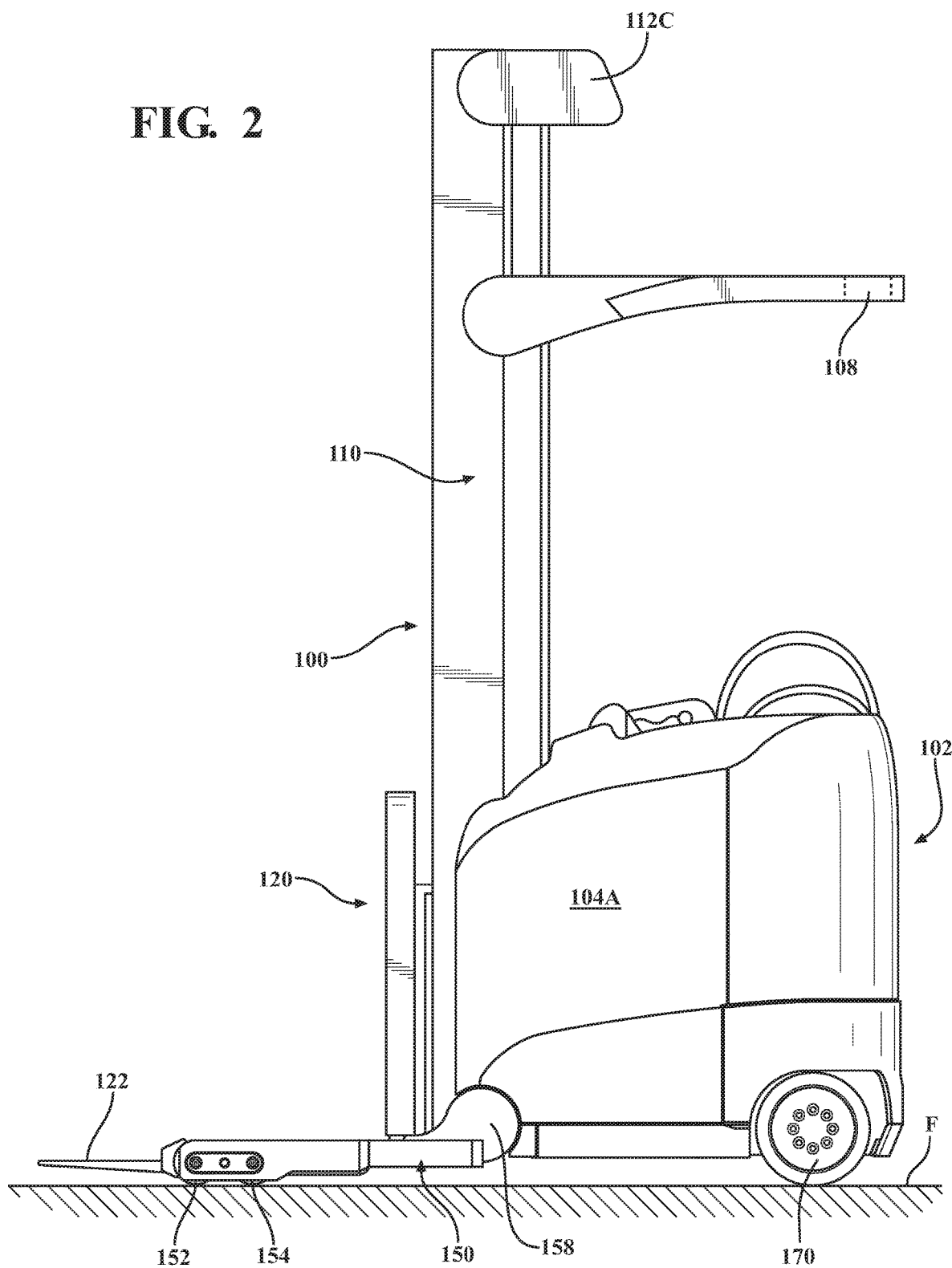
FIG. 2 is a side elevational view of the reach truck of FIG. 1.
Figure 3:
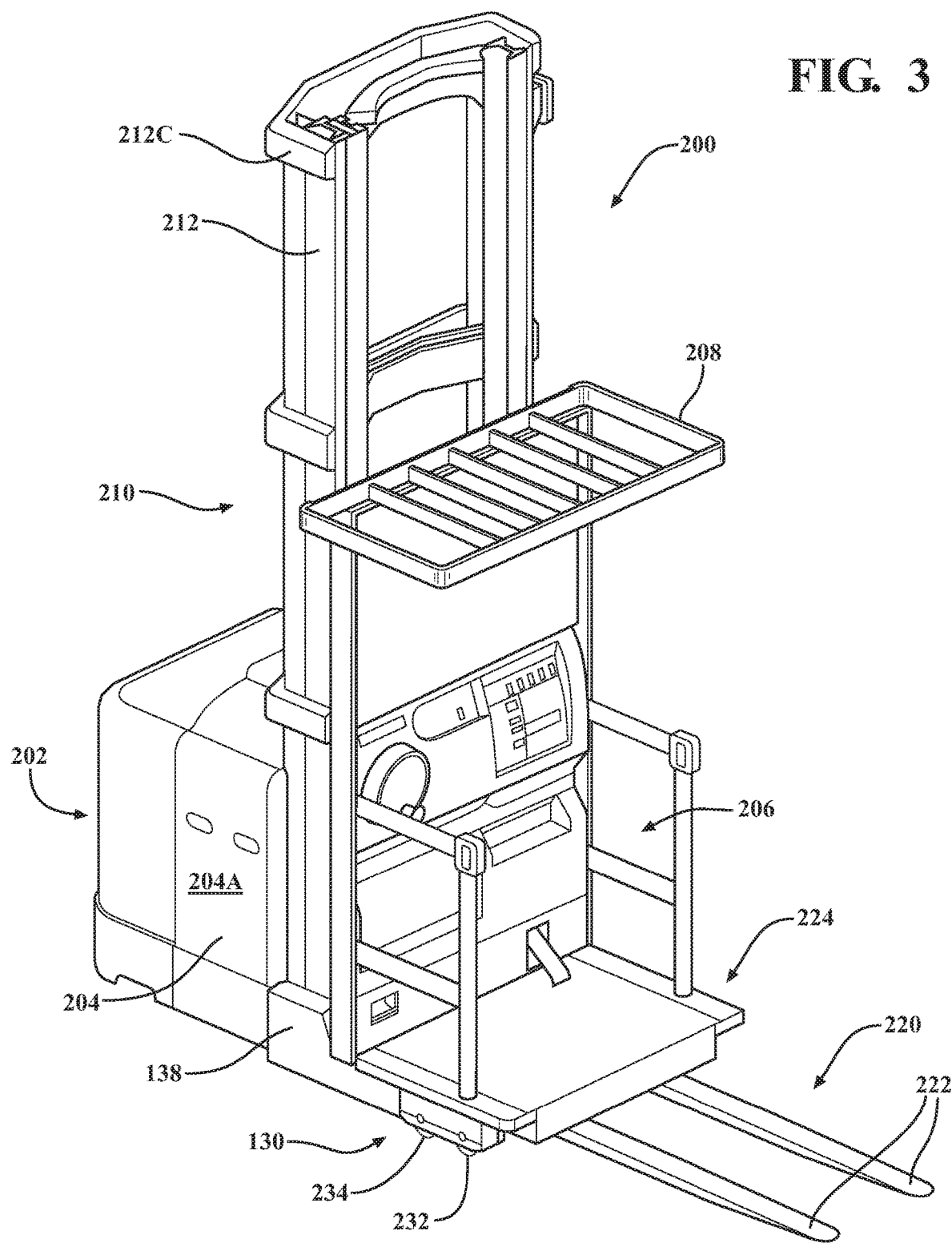
FIG. 3 is a perspective view of an industrial truck in the form of an order picker vehicle, in accordance with principles of the present disclosure.

With reference to FIGS. 1-3, exemplary industrial vehicles 100, 200 are shown. FIGS. 1 and 2 illustrate an exemplary materials handling vehicle in the form of a reach truck 100, and FIG. 3 illustrates an exemplary materials handling vehicle in the form of an order picker vehicle 200 (also referred to as a stock picker vehicle). While the present disclosure is made with reference to the illustrated vehicles 100, 200, it will be apparent to those of skill in the art that the vehicles 100, 200 may comprise a variety of other industrial vehicles, such as a turret truck, a tow tractor, a rider pallet truck, a walkie stacker truck, a counterbalance forklift truck, etc., and that the following description of the invention with reference to the Figures should not be limited to a reach truck or order picker vehicle unless otherwise specified.

With reference to FIGS. 1-3, the reach truck 100 may comprise a power unit 102 comprising a frame 104, an operator compartment 106, an overhead guard 108, a mast assembly 110, a fork carriage assembly 120 and a pair of forks 122 coupled to the fork carriage assembly 120 for movement with the fork carriage assembly 120. The order picker vehicle 200 may comprise a power unit 202 comprising a frame 204, an operator compartment 206, an overhead guard 208, a mast assembly 210, a platform assembly 224, and a pair of forks 222 coupled to the platform assembly 224 for movement with the platform assembly 224. The mast assembly 110, 210 is secured to the power unit 102, 202 and is positioned between a pair of outrigger arm assemblies 130, 150. In some examples, a battery (not shown), which may be housed in a battery compartment 104A, 204A within the frame 104, 204, supplies power to a drive or traction motor (not shown) and to one or more hydraulic motors (not shown). The power unit 102, 202 of each vehicle 100, 200 is supported on a plurality of wheels that enable the vehicles 100, 200 to move across a floor surface F (see FIG. 2). With reference to FIGS. 1 and 2, the reach truck 100 may comprise rear wheel assemblies comprising a steerable, powered wheel 170 located at the left rear of the power unit 102 and a caster wheel 172 located at the right rear of the power unit 102. Both the reach truck 100 and the order picker vehicle 200 may comprise the pair of outrigger arm assemblies 130, 150 comprising one or more non-driven outrigger wheels 132, 152, 134, 154, wherein the outrigger arm assemblies 130, 150 are fixed to the mast assembly 110, 210 and extend from the front of the vehicle 100, 200 (see FIG. 4; only outrigger arm assembly 150 is shown in FIGS. 1 and 2 and only outrigger arm assembly 130 is shown in FIG. 3). The order picker vehicle 200 may further comprise one or more rear wheel assemblies (not visible in FIG. 3) that are located under the rear of the power unit 202 and may comprise a steerable, powered wheel and an optional caster wheel.

With reference to FIGS. 1 and 3, the mast assembly 110, 210 of the vehicles 100, 200 may comprise a fixed mast member 112, 212 affixed to the frame 104, 204 and one or more nested, movable mast members (not separately labeled). It is noted that the vehicles 100, 200 may comprise two moveable mast members or additional or fewer movable mast members than two. The forks 122, 222 are movable in height between a lowered position and a plurality of raised positions. In the reach truck 100, the fork carriage assembly 120 is coupled to and is vertically movable along the mast assembly 110. As noted above, the forks 122 in the reach truck 100 are coupled to the fork carriage assembly 120 for movement with the fork carriage assembly 120. In the order picker vehicle 200, the platform assembly 224, which includes the operator compartment 206, is coupled to and is vertically movable along the mast assembly 210. The forks 222 may extend outward from a forward edge of the platform assembly 224, as shown in FIG. 3. In some examples, the forks 222 may be welded to or hooked onto the platform assembly 224. In other examples (not shown), the forks 222 of the order picker vehicle 200 may be supported on an auxiliary mast for vertical movement relative to the operator compartment 206, wherein the auxiliary mast is mounted to the platform assembly 224. In any event, in the order picker vehicle 200, the forks 222 are coupled to the mast assembly 210 via the platform assembly 224 alone or via the platform assembly 224 and the auxiliary mast.

In both vehicles 100, 200, the hydraulic motor(s) supply power to several different systems, such as one or more hydraulic cylinders (not shown) for effecting generally vertical movement of the movable mast members relative to the fixed mast member 112, 212 and generally vertical movement of the fork carriage assembly 120 of the reach truck 100 or the platform assembly 224 of the order picker vehicle 200 relative to a movable mast member of the mast assembly 110, 210. The outrigger arm assemblies 130, 150 are secured to the mast assembly 110, 210, which, in turn, is secured to the frame 104, 204. The outrigger arm assemblies 130, 150 are positioned such that the forks 122, 222, and any loads/pallets (not shown) carried thereby, may be lowered to the floor surface F between the outrigger arm assemblies 130, 150, without interference (see FIG. 2). As shown in FIG. 1, the outrigger arm assemblies 130, 150 in some examples may extend laterally outwardly.

Figure 4:
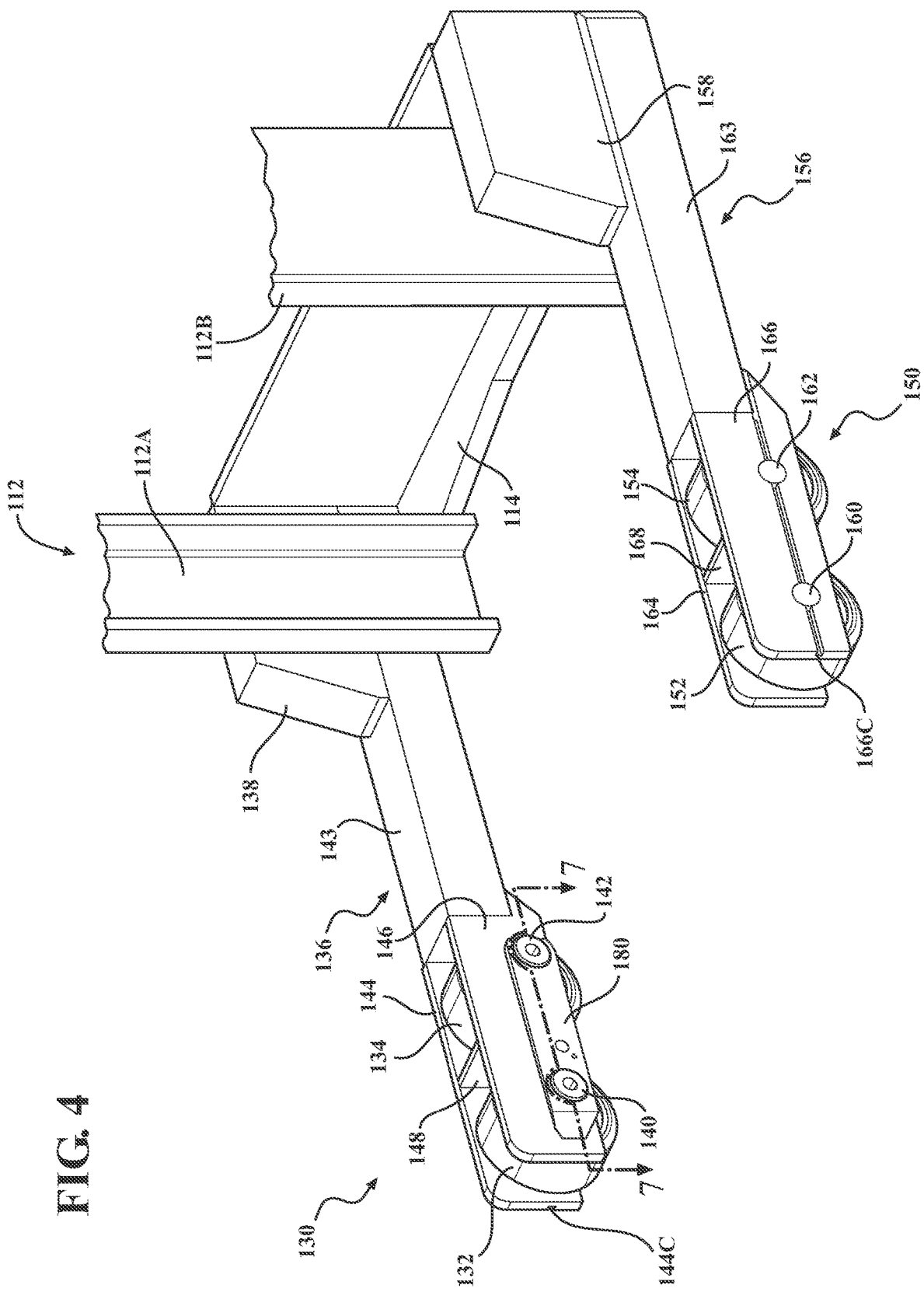
FIG. 4 is a detailed perspective view of the outrigger arm assemblies of an industrial vehicle, in accordance with principles of the present disclosure.

FIG. 4 is a detailed view of exemplary outrigger arm assemblies 130, 150, which may be located on either vehicle 100, 200 depicted in FIGS. 1-3. Each outrigger arm assembly 130, 150 comprises a respective frame member 136, 156 comprising a forwardly extending arm or support structure 143, 163 fixedly coupled, such as by welding, to the mast assembly 110 and a pair of opposing axle plates 144, 146, 164, 166 fixedly coupled, such as by welding, to a forward end of the corresponding support structure 143, 163. Each outrigger arm assembly 130, 150 may further comprise a divider 148, 168 extending between respective pairs of the axle plates 144, 146 and 164, 166 to provide structural support for the axle plates 144, 146, 164, 166. One or more first axles 140, 142 are fixed to the frame member 136 of the outrigger arm assembly 130, and more specifically, to the pair of axle plates 144, 146, as described herein such that the axles 140, 142 do not rotate or rotate only minimally relative to the axle plates 144, 146. One or more second axles 160, 162 are fixed to the frame member 156, and more specifically, to the pair of axle plates 164, 166 of the outrigger arm assembly 150 such that the axles 160, 162 do not rotate or rotate only minimally relative to the axle plates 164, 166. As used herein with respect to the axles 140, 142, 160, 162, the term "fixed" means that there is no movement or only a slight amount of movement of the axles 140, 142, 160, 162 relative to the axle plates 144, 146, 164, 166 and/or other components of the frame members 136, 156. A wheel 132, 134, 152, 154 is rotatably mounted to and supported on a respective one of the fixed axles 140, 142, 160, 162. A side member 180 is coupled to an outer surface (not separately labeled; see reference numeral 146-1 in FIGS. 5, 7, and 8) of the axle plate 146 of one of the outrigger arm assemblies 130.

With reference to FIGS. 1, 2, and 4, a torque arm 138, 158 may be coupled between each frame member 136, 156 and the mast assembly 110. The torque arms 138, 158 may comprise a quadrilateral shape, as shown in FIGS. 3 and 4, or a teardrop shape having a rounded end that tapers to a generally pointed end, as shown in FIGS. 1 and 2. A transverse plate 114 extends between and is fixed to the outrigger arm assemblies 130 and 150. The fixed mast member 112 may comprise vertical mast rails 112A, 112B that are spaced apart and welded at their lower ends to the torque arms 138, 158 and the transverse plate 114 and at their upper ends to a horizontally extending upper fixed mast rail 112C (the horizontally extending upper fixed mast rail 212C is shown in FIG. 3 with respect to the vehicle 200). The torque arms 138, 158, the transverse plate 114, and the support structures 143, 163 may all be welded together to form a main frame that is bolted to the frame 104 of the power unit 102. The main frame thus transfers weight from the wheels 132, 134, 152, 154 at the forward portion of the outrigger arm assemblies 130, 150 to the mast assembly 110 and the frame 104.

Figure 5:
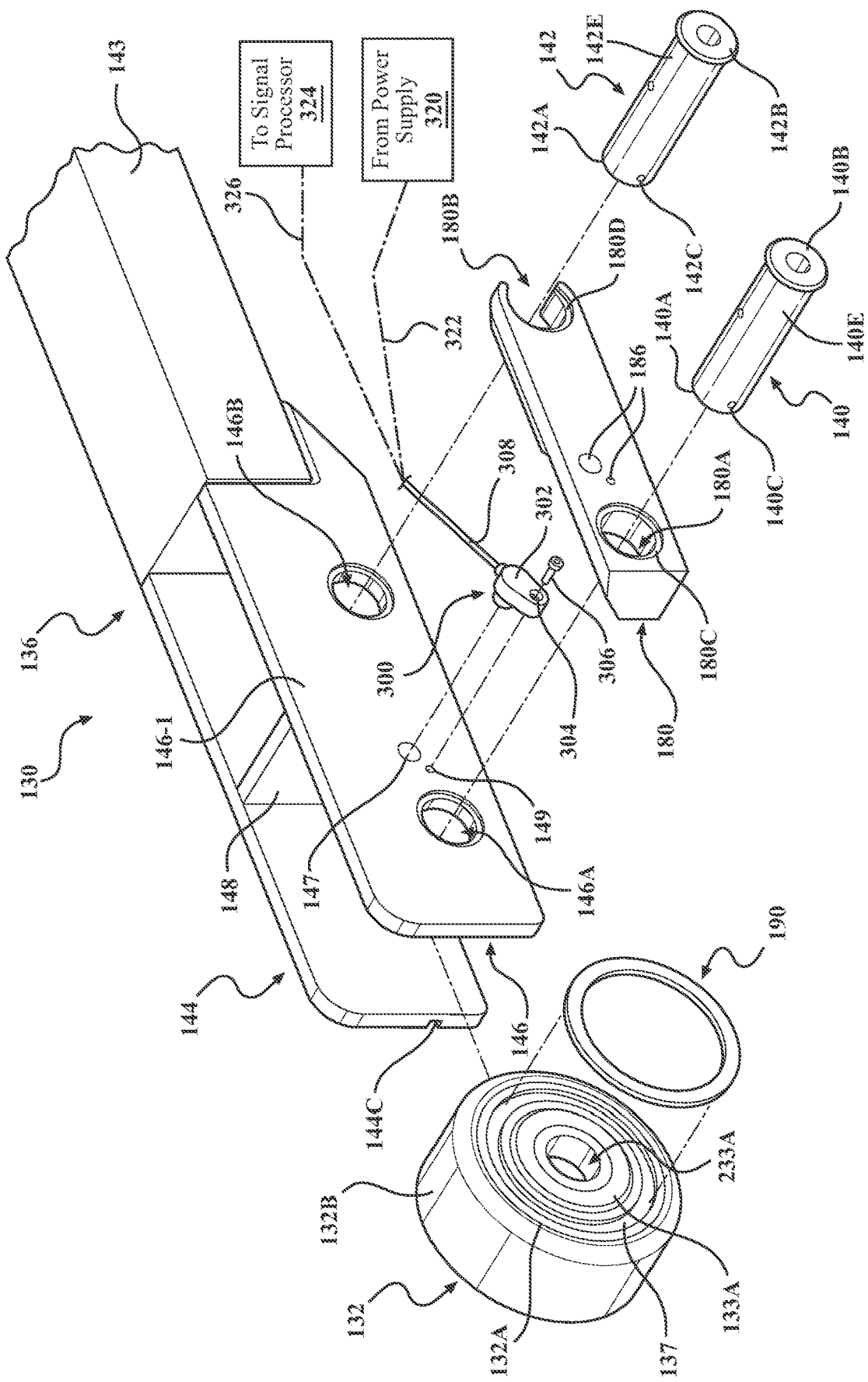
FIG. 5 is an exploded view of one of the outrigger arm assemblies of FIG. 4.
Figures 6, 8:
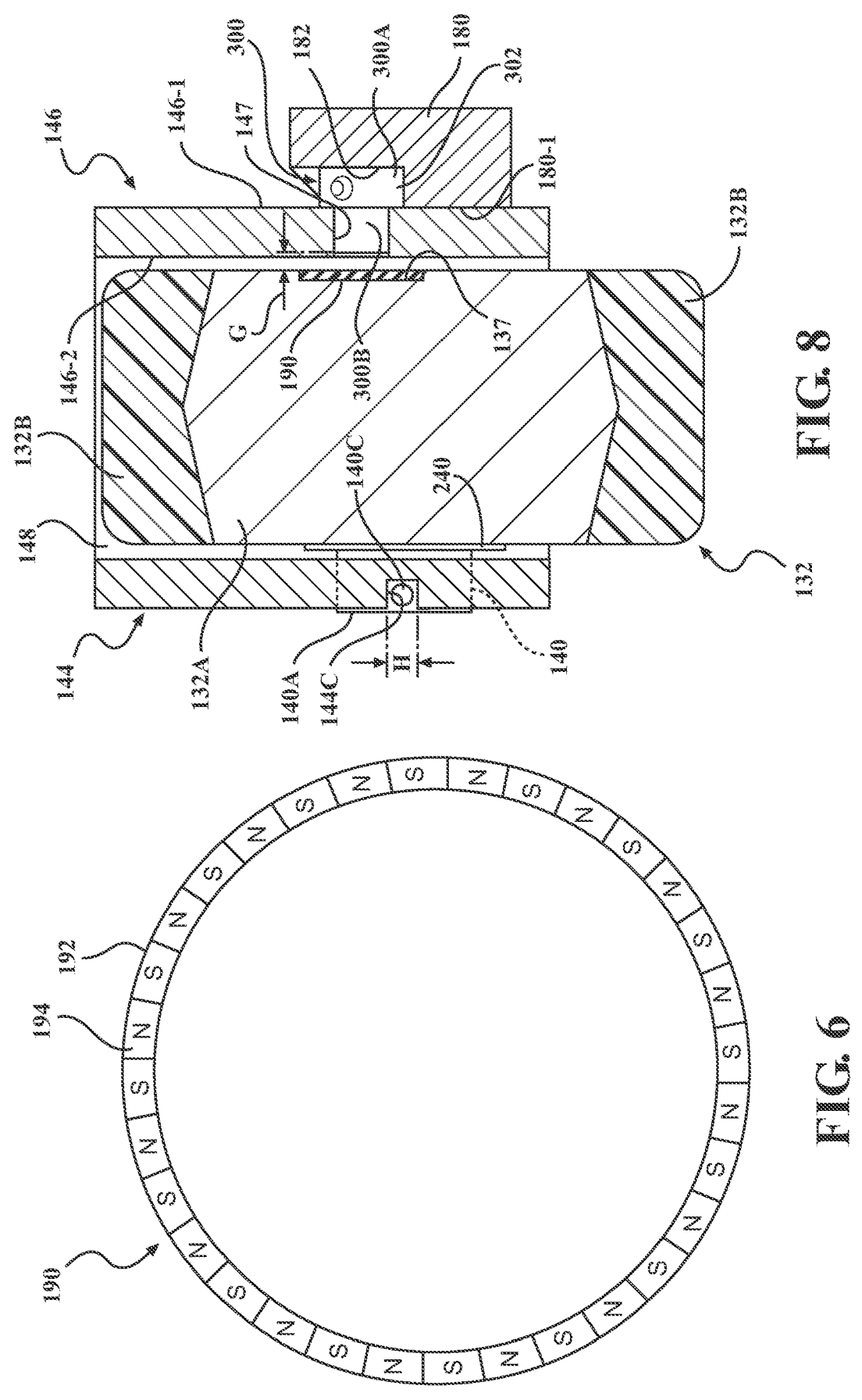
Figure 7:
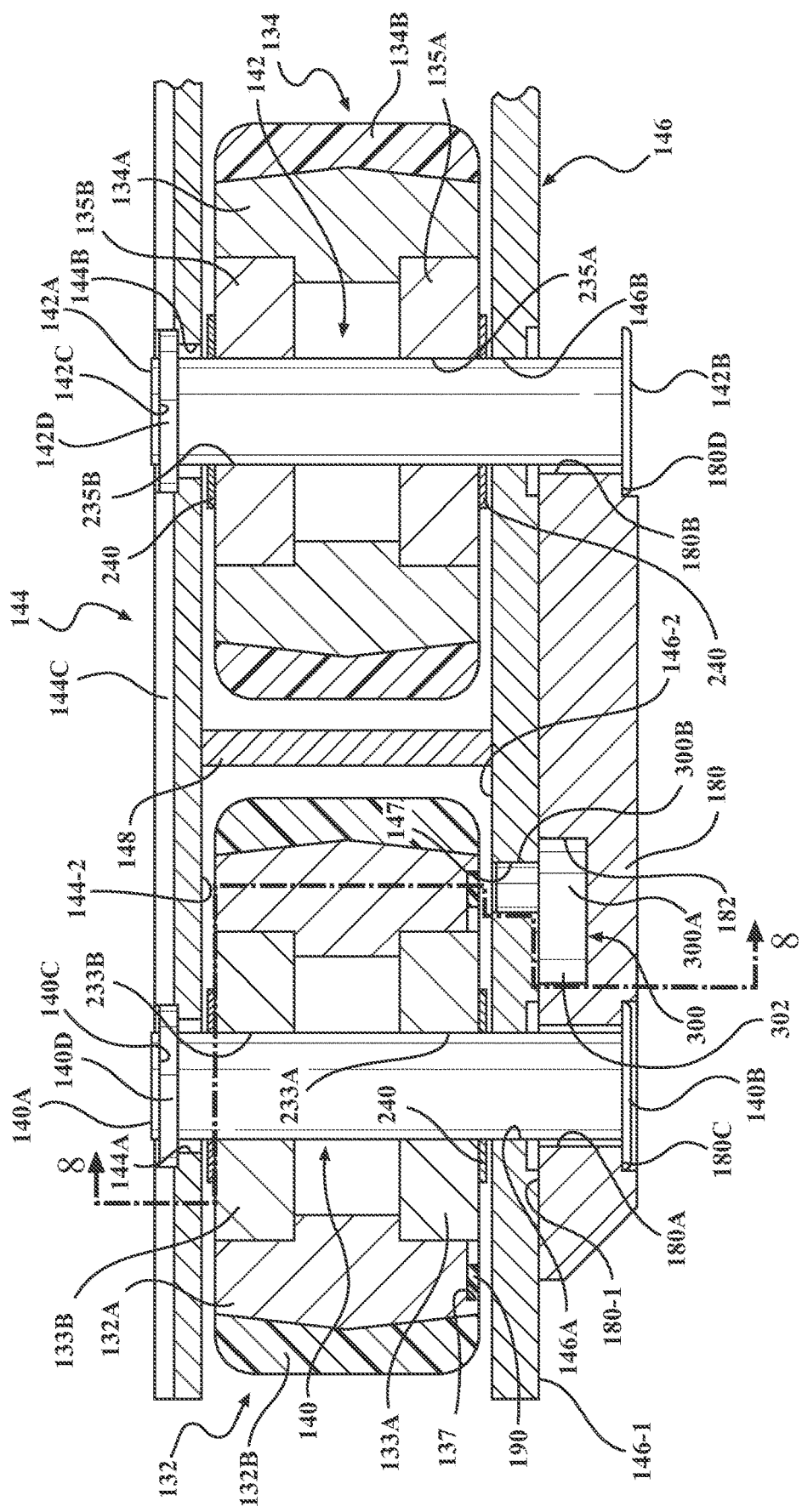
FIG. 7 is a cross-sectional view of one of the outrigger arm assemblies of FIG. 4 taken along line 7-7.
Figure 11A:
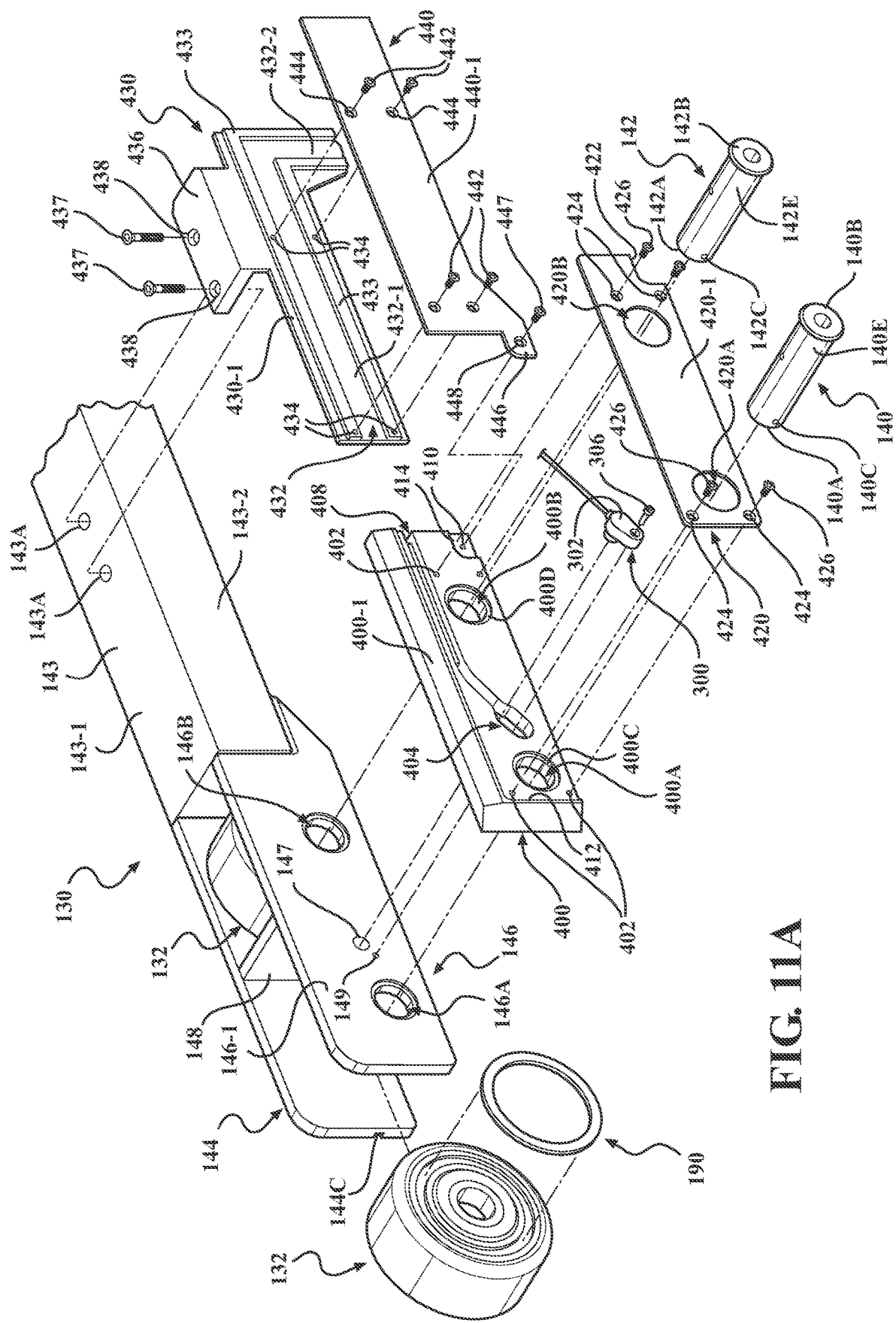
FIG. 11A is an exploded view of one of the outrigger arm assemblies of FIG. 9.

FIG. 5 is an exploded view of the outrigger arm assembly 130 of FIG. 4 comprising the side member 180, in which only one wheel 132 is shown to illustrate other aspects of the outrigger arm assembly 130 in detail (see also FIG. 11A, which depicts both wheels 132, 134). FIG. 6 is a detailed view of a code ring 190. FIG. 7 is a cross-sectional view of a portion of the outrigger arm assembly 130 in FIG. 4 taken along line 7-7, and FIG. 8 is a cross-sectional view taken along line 8-8 in FIG. 7.

With reference to FIGS. 5 and 7, each axle plate 144, 146 comprises bores 144A, 144B, 146A, 146B extending through a thickness of the axle plate 144, 146 for receiving a respective end 140A, 142A or a portion 140E, 142E of the axles 140, 142. The axles 140, 142 have first ends 140A, 142A having diameters that are equal to diameters of middle or intermediate portions of the axles 140, 142. The axles 140, 142 have second ends comprising collars 140B, 142B having diameters that are greater than the diameters of the middle or intermediate portions of the axles 140, 142. The axle plate 144 that receives the first ends 140A, 142A of the axles 140, 142 comprises a slot 144C that is formed along a longitudinal length of the axle plate 144 and that transects the axle plate bores 144A, 144B of the axle plate 144 (see also FIGS. 4 and 8; the axle plate 166 may comprise a corresponding slot 166C). The first ends 140A, 142A of each axle 140, 142 comprise an aperture 140C, 142C extending through a thickness of the axle 140, 142 for receiving a roll pin 140D, 142D. During installation, the first end 140A, 142A of each axle 140, 142 is inserted through the side member 180 and then through the axle plate 146 via a respective one of the bores 146A, 146B and a corresponding wheel 132, 134 and received in a respective one of the bores 144A, 144B of the axle plate 144. The roll pin 140D, 142D is inserted into the aperture 140C, 142C in the first end 140A, 142A of a respective one of the axles 140, 142 via the slot 144C and may be, for example, hammered into position such that the pin 140D, 142D is held in place via a friction fit. As shown in FIG. 7, a length of the roll pins 140D, 142D is greater than the diameter of the first ends 140A, 142A of the axles 140, 142 as well as the diameters of the axle plate bores 144A, 144B of the axle plate 144. Hence, the roll pins 140D, 142D protrude from either side of each axle 140, 142 and engage a portion of the axle plate 144 surrounding the axle plate bores 144A, 144B, thereby securing the first ends 140A, 142A of the axles 140, 142 in the axle plate bores 144A, 144B and preventing axial movement of the axles 140, 142 out of the bores 144A, 144B in a direction away from the axle plate 144. The slot 144C has a height H (see FIG. 8) that is sized so as to allow very little, if any rotation, of the pins 140D, 142D in the slot 144C, thereby preventing rotation or allowing only very little rotation of the axles 140, 142 in the axle plates 144, 146.

The side member 180 may comprise one or more openings 180A, 180B through which the axle(s) 140, 142 are received, as shown in FIGS. 5 and 7. The side member 180 may also comprise recesses 180C, 180D surrounding the openings 180A, 180B, wherein the recesses 180C, 180D have diameters that are larger than the diameters of the openings 180A, 180B and a depth having a dimension of about 0.1 inches to about 0.5 inches. In some particular examples, the recesses 180C, 180D may comprise a depth of about 0.125 inches. The axle collars 140B and 142B are received in the recesses 180C, 180D during assembly of the axles 140, 142 in the axle plates 144, 146. The axle collars 140B, 142B circumferentially engage a circumferential portion of the side member 180 defining a base portion of each of the recesses 180C, 180D to maintain the axles 140, 142 properly positioned relative to the side member 180, i.e., so as to prevent the axles 140, 142 from moving axially completely through the side member 180 in a direction toward the axle plates 144 and 146. With reference to FIGS. 7 and 8, one or more washers 240 may be provided on the axles 140, 142 between each wheel 132, 134 and inner surfaces 144-2, 146-2 of the axle plates 144, 146 to space the wheels 132, 134 from the axle plates 144, 146.

With reference to FIGS. 5, 7, and 8, each wheel 132, 134 comprises a casted wheel 132A, 134A and an inner bearing 133A, 135A and an outer bearing 133B, 135B mounted within the respective casted wheel 132A, 134A, wherein each bearing 133A, 133B, 135A, 135B comprises an opening 233A, 233B, 235A, 235B that receives a corresponding one of the axles 140, 142. Each wheel 132, 134 also comprises a wheel cover 132B, 134B formed over the corresponding casted wheel 132A, 134A made, for example, from polyurethane. At least one of the casted wheels, e.g., wheel 132A, comprises a wheel recess 137 in a sidewall (not separately labeled) of the casted wheel 132A that is concentric with the bearing openings 233A, 233B. The wheel recess 137 may be machined into the sidewall of the casted wheel 132A. A code ring 190 is located and fixed within the wheel recess 137 such that the code ring 190 rotates with the wheel 132. As shown in FIG. 6, the code ring 190 may comprise a magnetized ring with alternating north N and south S poles around a perimeter or circumference 192 of the magnetized ring. The code ring 190 may comprise a polymer-bonded magnet, such as bonded ferrite, with a magnetized side 194 that faces toward the inner surface 146-2 of the axle plate 146. In some particular examples, the code ring 190 may comprise 32 alternating N/S poles (16 N and 16 S) around the perimeter 192, as shown in FIG. 6. Suitable code rings may be purchased, for example, from Phoenix America, Inc. (Fort Wayne, Ind.).

As shown in FIG. 5, a sensor device 300 is coupled to the frame member 136 of the outrigger arm assembly 130. In particular, the sensor device 300 may be coupled to the outer surface 146-1 of the inner axle plate 146 of the outrigger arm assembly 130. The sensor device 300 may comprise a housing 302 having a main body 300A with a bore 304 extending through a thickness of the main body 300A of the housing 302. A fastener 306 may extend through the bore 304 and engage a bore 149 that is formed in the axle plate 146 to couple the main body 300A of the housing 302 to the outer surface 146-1 of the axle plate 146. The fastener 306 may comprise, for example, a screw, a bolt, or other suitable type of fastener. In some examples, the bore 149 may extend fully through the thickness of the axle plate 146 and be threaded. In other examples, the bore 149 may comprise a blind or tapped bore that extends partially through the thickness of the axle plate 146. As described herein, the sensor device 300 comprises a cable 308 that extends from the sensor device 300 toward the mast assembly 110 and is coupled to one or more components, such as a power supply 320 and a signal processor 324.

As shown in FIGS. 5, 7, and 8, the axle plate 146 may comprise a further bore 147 extending through the thickness of the axle plate 146. A portion 300B of the housing 302 of the sensor device 300 (also referred to herein as a portion 300B of the sensor device 300) may extend out of plane with the main body 300A of the housing 302 of the sensor device 300. The portion 300B, which may include sensing elements as described herein, extends at least partially through the bore 147. The portion 300B of the housing 302 of the sensor device 300 may extend through the axle plate 146 such that an outermost surface (not separately labeled) of the portion 300B is either flush with the inner surface 146-2 of the axle plate 146 or slightly recessed within the axle plate 146, as best seen in FIGS. 7 and 8.

The side member 180 may be positioned over the sensor device 300 to protect the sensor device 300 and the cable 308 from impacts and from contamination by foreign matter such as dirt, water, etc. As shown in FIGS. 7 and 8, a cavity 182 may be defined in an inner surface 180-1 of the side member 180 that faces the axle plate 146. The cavity 182 receives and encloses the sensor device 300. The inner surface 180-1 of the side member 180 may also comprise a channel (not shown) that receives the cable 308 extending from the sensor device 300 and secures the cable 308 adjacent to the outer surface 146-1 of the axle plate 146. As shown in FIG. 5, the side member 180 may comprise auxiliary bores 186 corresponding to the bores 147, 149 formed in the axle plate 146. The auxiliary bores 186 may serve as drill guides for creating the bores 147, 149 in the axle plate 146, particularly for purposes of retrofitting existing vehicles with sensor devices 300. Because the side member 180 is mounted via the axles 140, 142, the auxiliary bores 186 formed in the side member 180 will be aligned with the desired location on the axle plate 146 following installation of the side member 180 on the axle plate 146. The side member 180 is held in position against the axle plate 146 via the axles 140 and 142 and the axle collars 140B, 142B positioned in the recesses 180C, 180D of the side member 180.

Figure 9:
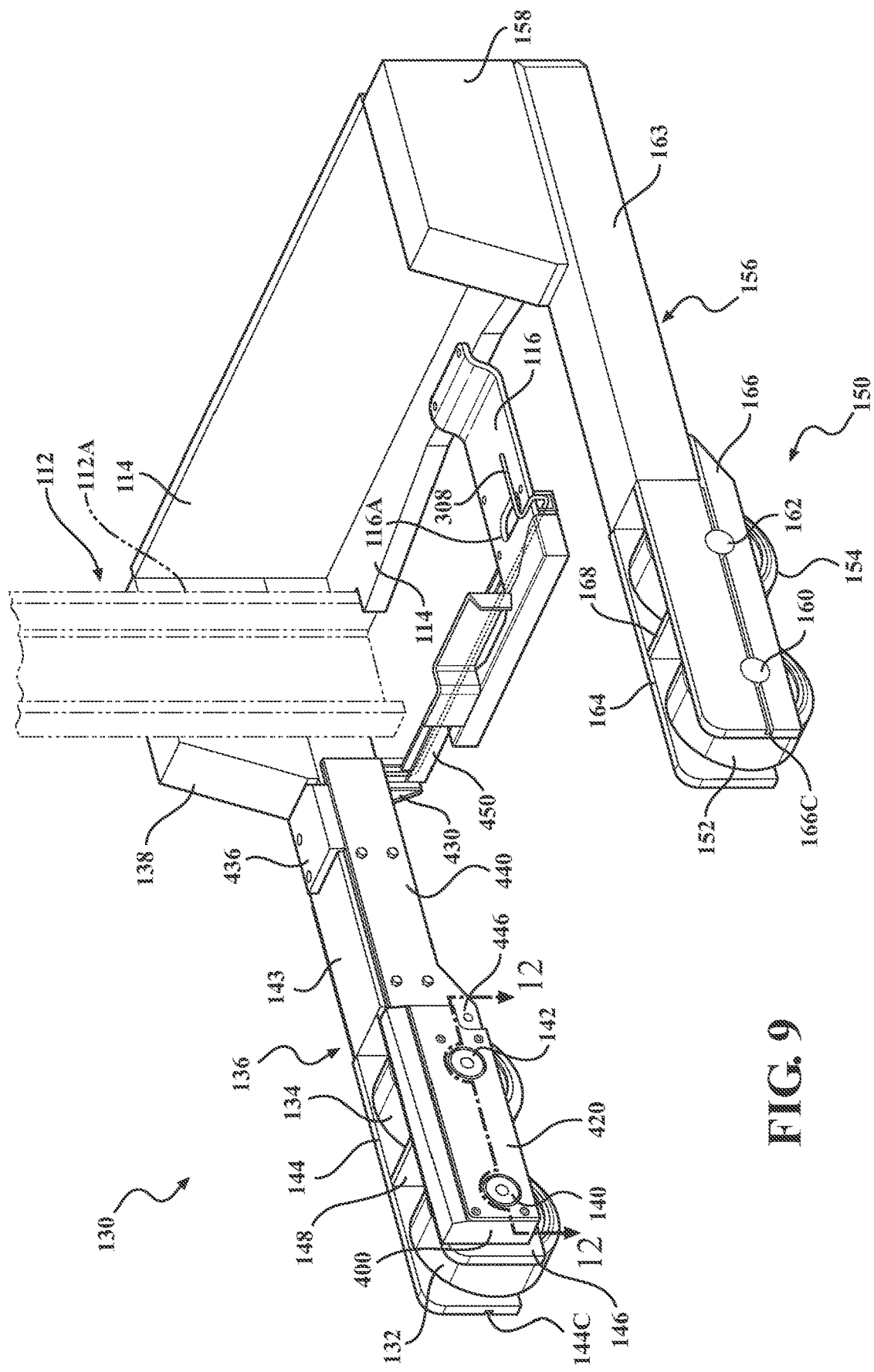
FIG. 9 is a detailed perspective view of the outrigger arm assemblies of an industrial vehicle, in accordance with principles of the present disclosure.
Figure 10:
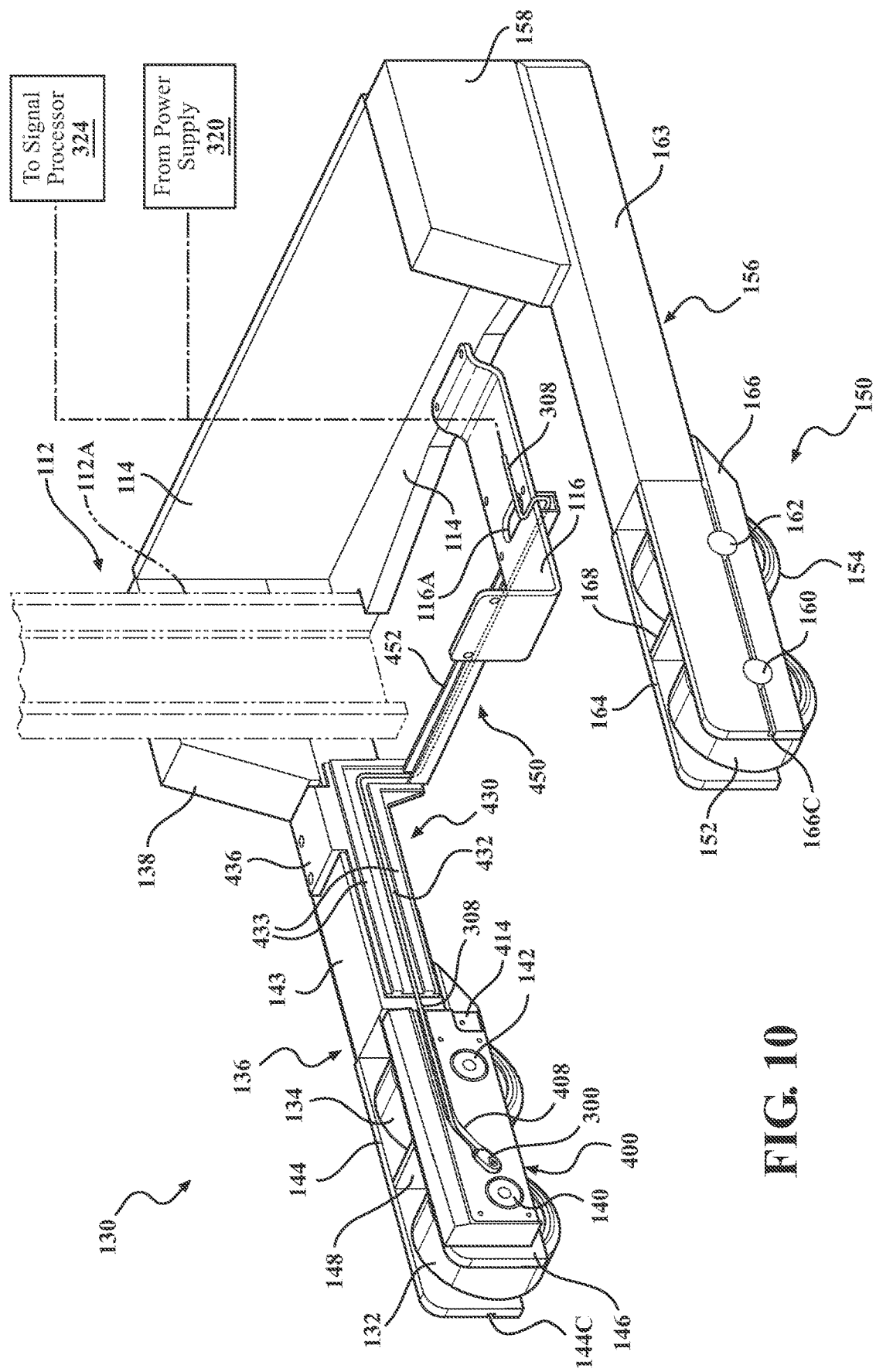
FIG. 10 is a detailed perspective view of the outrigger arm assemblies of FIG. 9.
Figure 11B:
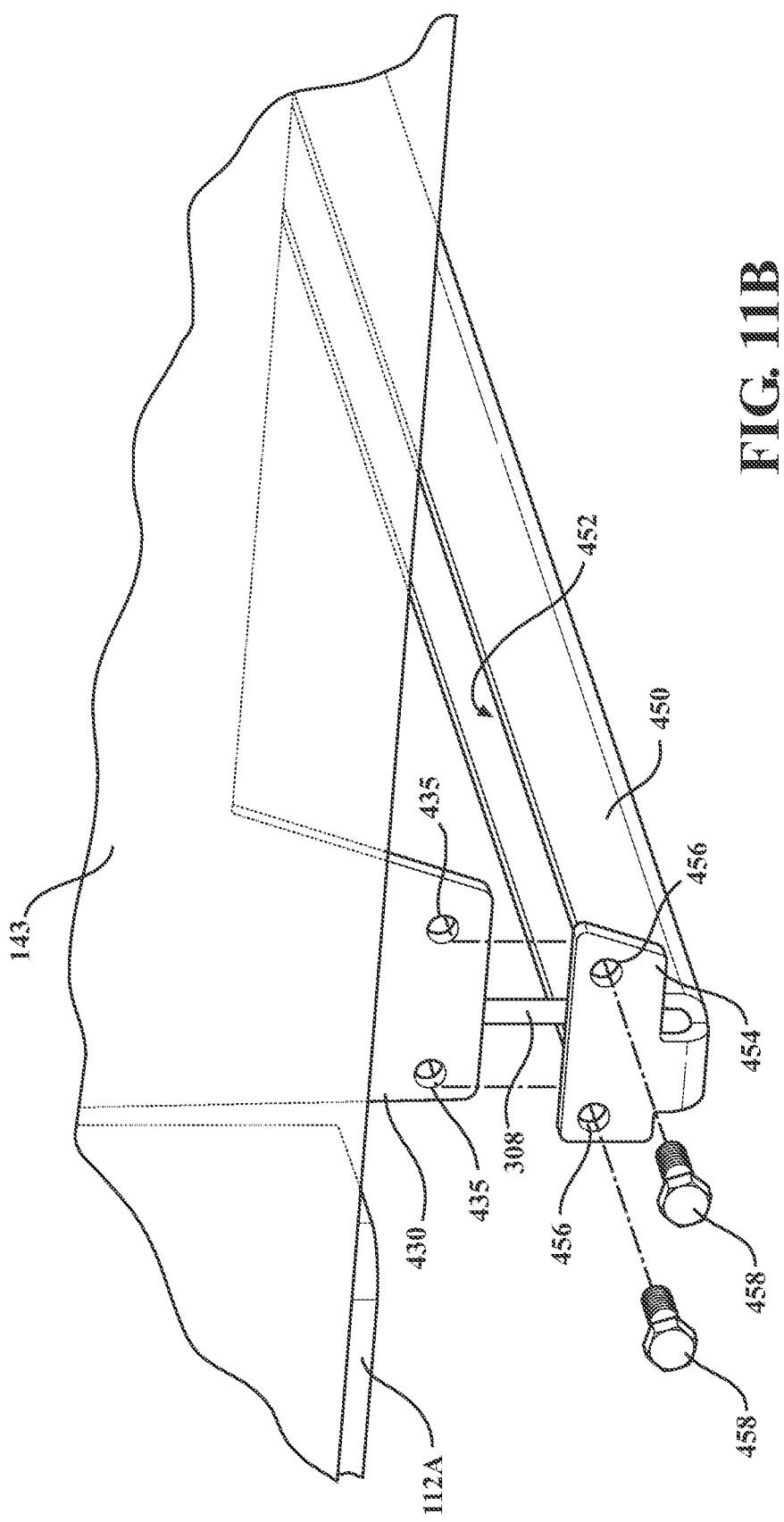
FIG. 11B is a detailed exploded view of a portion of the outrigger arm assembly of FIG. 11A.
Figure 12:
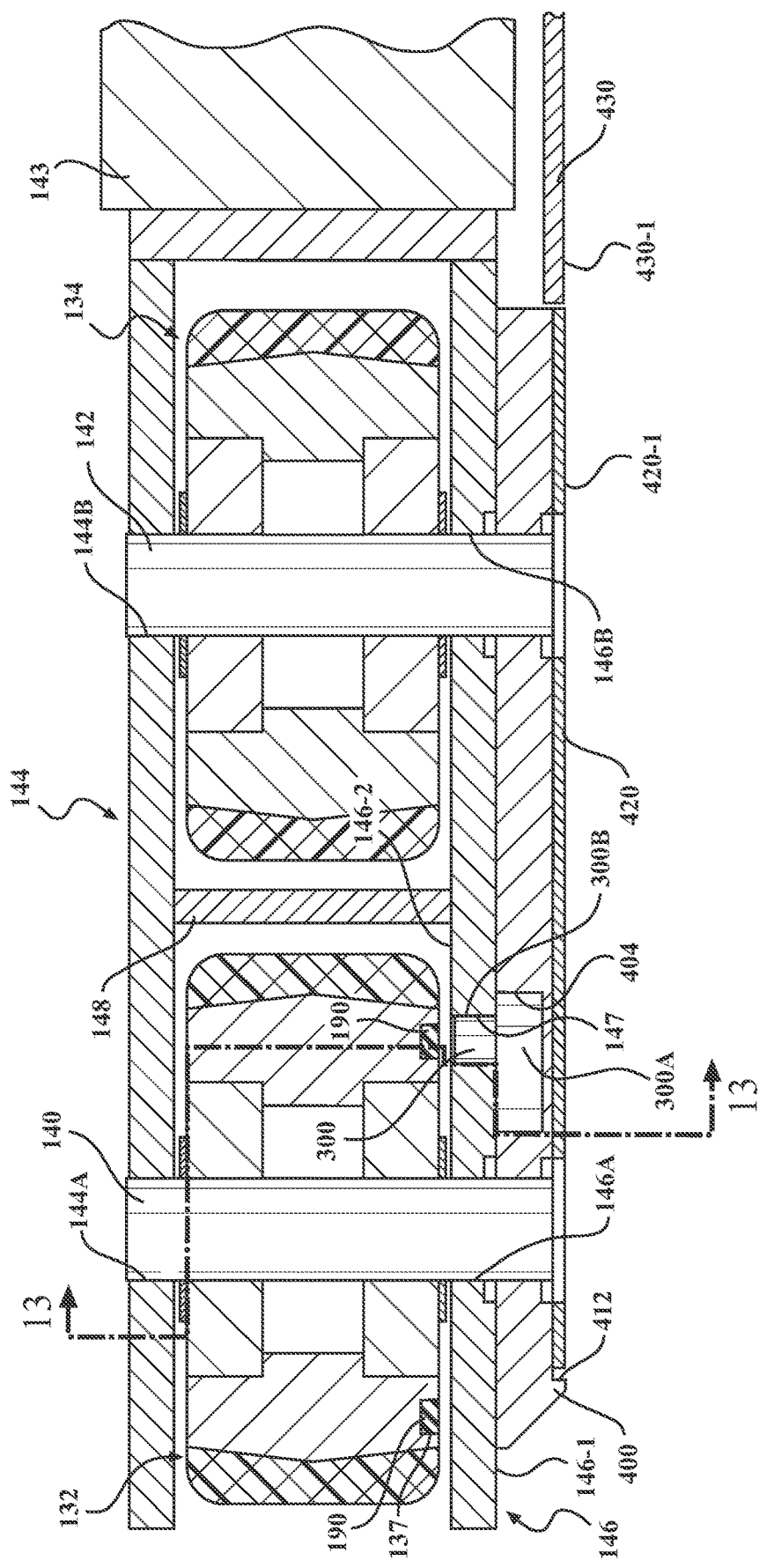
FIG. 12 is a cross-sectional view of one of the outrigger arm assemblies of FIG. 9 taken along line 12-12.
Figure 13:
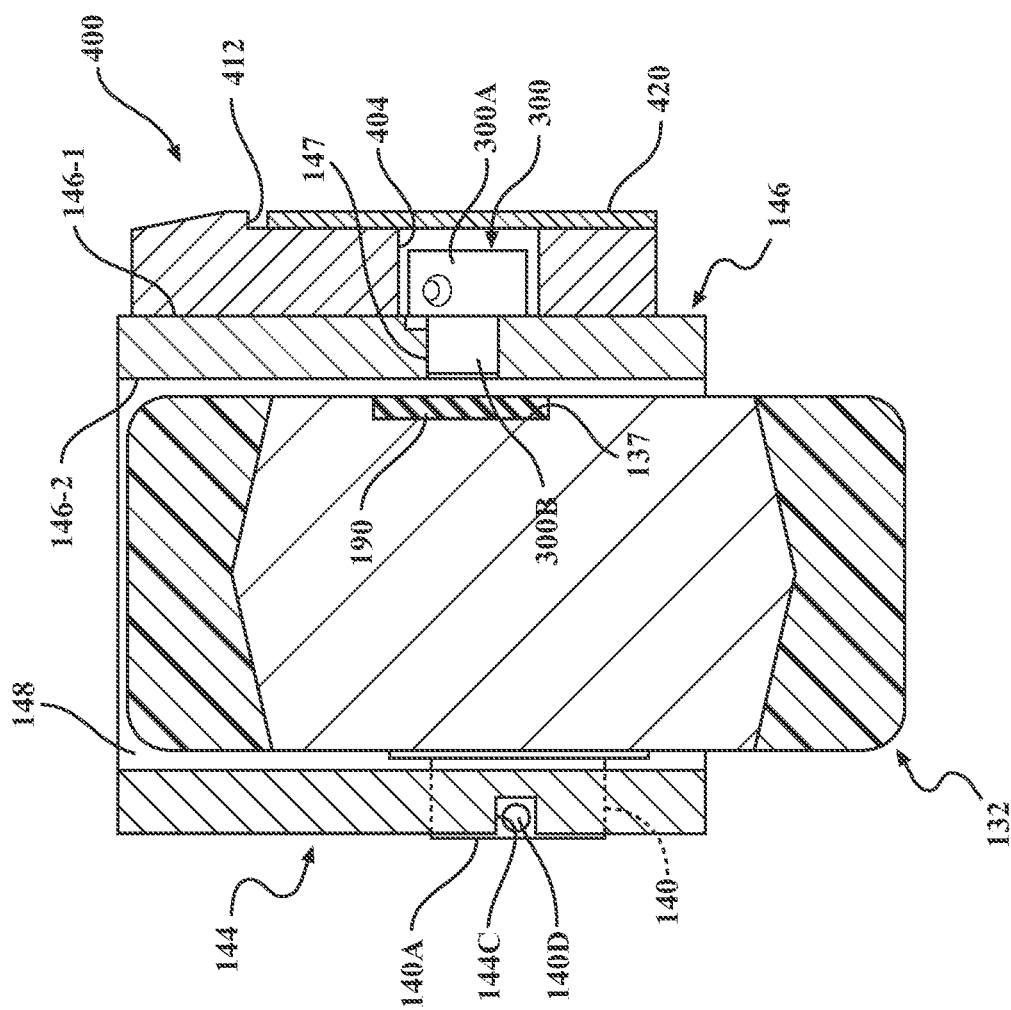
FIG. 13 is a cross-sectional view taken along line 13-13 in FIG. 12.

FIGS. 9 and 10 are detailed views of additional exemplary outrigger arm assemblies 130, 150, which may be located on either vehicle 100, 200 depicted in FIGS. 1-3. FIG. 11A is an exploded view of the outrigger arm assembly 130 of FIG. 9, and FIG. 11B is a detailed exploded view of a portion of the outrigger arm assembly 130 of FIG. 11A. FIG. 12 is a cross-sectional view of a portion of the outrigger arm assembly 130 in FIG. 9 taken along view line 12-12, and FIG. 13 is a cross-sectional view taken along line 13-13 in FIG. 12.

The outrigger arm assemblies 130, 150 depicted in FIGS. 9-13 may be substantially similar in structure to the outrigger arm assemblies 130, 150 depicted in FIGS. 4, 5, 7, and 8. Some components are removed and labeling of some components is eliminated in FIGS. 9-13 to illustrate other aspects of the invention in detail. With reference to FIGS. 9 and 10, each outrigger arm assembly 130, 150 comprises a respective frame member 136, 156 comprising a support structure 143, 163 fixedly coupled to the mast assembly 110, a pair of opposing axle plates 144, 146, 164, 166 fixedly coupled to a forward end of the corresponding support structure 143, 163, and a divider 148, 168 extending between respective pairs of the axle plates 144, 146 and 164, 166. One or more first axles 140, 142 are fixed to the frame member 136 of the outrigger arm assembly 130, and more specifically, to the pair of axle plates 144, 146. One or more second axles 160, 162 are fixed to the frame member 156, and more specifically, to the pair of axle plates 164, 166 of the outrigger arm assembly 150. A wheel 132, 134, 152, 154 is rotatably mounted to and supported on a respective one of the fixed axles 140, 142, 160, 162. A torque arm 138, 158 may be coupled between each frame member 136, 156 and the mast assembly 110. As noted above, the fixed mast member 112 may comprise first and second fixed vertical mast rails (only one vertical mast rail 112A is shown in phantom in FIGS. 9 and 10; see FIG. 4). A transverse plate 114 extends between and is fixed to the outrigger arm assemblies 130 and 150. As described above, the torque arms 138, 158, the transverse plate 114, and the support structures 143, 163 may be welded together to form a main frame that is bolted to the frame of the power unit (not shown; see FIGS. 1-3), and the vertical mast rails 112A are welded to the torque arms 138, 158 and the transverse plate 114.

As shown in FIGS. 9, 10, and 11A, one of the outrigger arm assemblies 130 comprises a first side member 400 coupled to an outer surface 146-1 of the axle plate 146, a first cover plate 420 coupled to the first side member 400, a second side member 430 coupled to an upper surface 143-1 of the support structure 143 adjacent to the first side member 400, and a second cover plate 440 coupled to the second side member 430. The cover plates 420, 440 are removed in FIG. 10 to illustrate additional details of the side members 400, 430. A cable guide member 450 extends between the support structure 143 and a support member 116 that is coupled to the transverse plate 114. As described in more detail with respect to FIGS. 11A, 12, and 13, the first side member 400 receives a sensor device 300, and the first and second side members 400, 430 and the cable guide member 450 receive a cable 308 extending from the sensor device 300 toward the mast assembly 110. The side members 400, 430 protect the cable 308 and may isolate the cable 308 from contact with the axle plate 146 and the support structure 143. Although not shown, the configuration depicted in FIGS. 4-8 may include one or more similar structures that receive and protect the cable 308 extending from the sensor device 300 toward the mast assembly 110.

With reference to FIGS. 11A and 12, each axle plate 144, 146 of the outrigger arm assembly 130 comprises respective bores 144A, 144B, 146A, 146B extending through a thickness of the axle plate 144, 146 for receiving a respective first end 140A, 142A or portion 140E, 142E of each axle 140, 142. The axle plate 144 that receives the first ends 140A, 142A of the axles 140, 142 comprises a slot 144C formed along the longitudinal length of the axle plate 144 (see also FIGS. 9, 10, and 13; the axle plate 166 may comprise a corresponding slot 166C). The first ends 140A, 142A of each axle 140, 142 comprise an aperture 140C, 142C extending through a thickness of the axle 140, 142 for receiving a roll pin 140D, as shown in FIGS. 11A and 13 (only one roll pin is shown in FIG. 13; see FIG. 7 depicting roll pins 140D, 142D). The axles 140, 142 may be installed in the axle plates 144, 146 using the roll pins as described herein such that the axles 140, 142 do not rotate or rotate only minimally relative to the axle plates 144, 146.

With continued reference to FIGS. 11A and 12, the first side member 400 may comprise openings 400A, 400B and recesses 400C, 400D surrounding the openings 400A, 400B. As previously described, the openings 400A, 400B receive the axles 140, 142, and the recesses 400C, 400D receive the axle collars 140B, 142B, which circumferentially engage a base portion of each of the recesses 400C, 400D to properly position the axles 140, 142. One or more washers (not labeled; see reference numeral 240 in FIGS. 7 and 8) may be provided on the axles 140, 142. As previously described, each wheel 132, 134 may comprise a casted wheel and inner and outer bearings with openings (not separately labeled) that receive a corresponding one of the axles 140, 142. At least one of the casted wheels, e.g., the casted wheel of wheel 132, comprises a wheel recess 137 that is formed in a sidewall of the casted wheel and is concentric with the bearing openings. A code ring 190, which may be substantially similar to the code ring 190 depicted in FIG. 6, is located and fixed within the wheel recess 137 such that the code ring 190 rotates with the wheel 132.

As shown in FIGS. 10, 11A, 12, and 13, the sensor device 300 and its cable 308 may be positioned adjacent to the outrigger arm assembly 130 and protected via the first and second side members 400, 430. The sensor device 300 may be substantially similar to the sensor device 300 depicted in FIGS. 4, 5, 7, and 8. The sensor device 300 may comprise a housing 302 having a main body 300A and a portion 300B that extends out of plane with the main body 300A. A cable 308 extends from the sensor device 300 toward the mast assembly 110. The first side member 400 comprises an opening 404 that extends through a thickness of the first side member 400 and is designed to receive and partially enclose the sensor device 300. A fastener 306 may extend through a bore formed in the main body 300A of the housing 302 of the sensor device 300 and engage a bore 149 that is formed in the axle plate 146 such that the main body 300A of the housing 302 of the sensor device 300 is directly coupled to the outer surface 146-1 of the axle plate 146, as shown in FIGS. 12 and 13. The axle plate 146 may comprise a further bore 147 extending through the thickness of the axle plate 146, and the portion 300B of the housing 302 of the sensor device 300, which may include sensing elements as described herein, extends at least partially through the bore 147 such that an outermost surface (not separately labeled) of the portion 300B is either flush with the inner surface 146-2 of the axle plate 146 or slightly recessed within the axle plate 146, as best seen in FIGS. 12 and 13. The thickness of the first side member 400 may be greater than or equal to a thickness of the main body 300A of the housing of the sensor device 300, as depicted in FIGS. 12 and 13.

A channel comprising a first cable guide 408 is defined so as to extend inwardly from an outer surface 400-1 of the first side member 400 and may extend partially or completely through a thickness of the first side member 400, as shown in FIGS. 10 and 11A. The first cable guide 408 receives the cable 308 extending from the sensor device 300. In some examples, at least a section of the first cable guide 408 extends only partially through the thickness of the first side member 400 such that the cable 308 is isolated from and not in contact with the outer surface 146-1 of the axle plate 146. The sensor device 300 may be positioned such that the cable 308 extends from the sensor device 300 at an angle toward the upper or lower surface (not separately labeled) of the axle plate 146. A section of the first cable guide 408 may be curved to gradually change a direction of the cable 308 such that the cable 308 extends along the longitudinal length of the axle plate 146 without kinking or damaging the cable 308 or the coupling between the cable 308 and the sensor device 300.

As shown in FIGS. 11A, 12, and 13, the first cover plate 420 is coupled to the outer surface 400-1 of the first side member 400. In some examples, the first side member 400 may comprise a first recessed portion 412 that is designed to receive the first cover plate 420. In some particular examples, a depth of the first recessed portion 412 may correspond to a thickness of the first cover plate 420 such that an outer surface 420-1 of the first cover plate 420 is flush with an adjacent portion of the outer surface 400-1 of the first side member 400 to avoid damage due to impacts. The first cover plate 420 covers and protects the sensor device 300 and the cable 308 from impacts and from contamination by foreign matter such as dirt, water, etc. The first cover plate 420 comprises openings 420A, 420B that extend through a thickness of the first cover plate 420 and are concentric with the openings 400A, 400B formed in the first side member 400 and the bores 144A, 144B, 146A, 146B formed in the axle plates 144, 146. A diameter of the openings 420A, 420B is greater than the diameter of any portion of the axles 140, 142 such that the axles 140, 142 may be inserted and removed without removing the first cover plate 420, as described below.

The second side member 430 is coupled to the support structure 143 and is positioned adjacent to the first side member 400. The second side member 430 comprises a second cable guide 432 that receives the cable 308 extending from the first side member 400, as shown in FIGS. 10 and 11A. The second cable guide 432 may be defined, for example, between two ridges or raised portions 433 formed on an outer surface 430-1 of the second side member 430. The second cable guide 432 may comprise a first section 432-1 that extends along a longitudinal length of the support structure 143, and a second section 432-2 that extends substantially perpendicular to the first section 432-1 and extends below the support structure 143. A distance between the raised portions 433 may be varied such that the cable 308 is able to bend approximately 90 degrees without kinking or damaging the cable 308, as shown in FIGS. 10 and 11A. The second side member 430 may be coupled to the support structure 143 via a flange 436 that extends above the second cable guide 432 and is substantially perpendicular to a main body (not separately labeled) of the second side member 430. The flange 436 comprises apertures 438 that extend through a thickness of the flange 436. Fasteners 437, which may comprise screws, bolts, or other suitable fasteners, extend through the apertures 438 in the flange 436 and are received in corresponding blind or tapped bores 143A formed in the upper surface 143-1 of the support structure 143. Thus, the second side member 430 is coupled to the support structure 143 such that the main body comprising the second cable guide 432 extends along a sidewall 143-2 of the support structure 143. As shown in FIGS. 9 and 10, the flange 436 may abut the torque arm 138 such that the apertures 438 formed in the flange 436 may serve as a drill guide for forming the bores 143A in the upper surface 143-1 of the support structure 143, particularly for purposes of retrofitting existing vehicles with sensor devices 300.

The second cover plate 440 may be coupled to the outer surface 430-1 of the second side member 430, e.g., to the raised portions 433, such that the second cover plate 440 covers and protects the cable 308. In some configurations, as shown in FIGS. 9 and 10, there may be a gap between the first and second side members 400, 430, and the second cover plate 440 may extend across the gap and abut the first cover plate 420 to cover the exposed portion of the cable 308. In some examples, the second cover plate 440 may comprise an extension 446 that projects from a corner of the second cover plate 440 toward the first cover plate 420, as shown in FIGS. 9 and 11A. The outer surface 400-1 of the first side member 400 may comprise a corresponding second recessed portion 414 that receives the extension 446 of the second cover plate 440, and the first cover plate 420 may comprise a notch 422 corresponding to the extension 446. The extension 446 may be used to help properly position the second cover plate 440 with respect to the first side member 400 and the first cover plate 420 and to prevent pivoting of the first side member 400 and the first cover plate 420 during installation, as described below. The extension 446 may also help to bridge the gap between the first and second side members 400, 430.

A height of the raised portions 433 of the second side member 430 and/or a thickness of the second cover plate 440 may be varied such that respective outer surfaces 420-1, 440-1 of the first and second cover plates 420, 440 are flush with each other and form a substantially continuous surface extending from a forward end of the outrigger arm assembly 130 toward the mast assembly 110, as shown in FIGS. 9, 11A, and 12. For example, as best seen in FIGS. 11A and 12, the support structure 143 may be wider than axle plates 144, 146, and the height of the raised portions 433 and/or the thickness of the second cover plate 440 may be varied to account for this difference in width between the support structure 143 and the axle plates 144, 146. In addition, a depth of the second recessed portion 414 may be varied to take into account the height of the raised portions 433 and/or the thickness of the second cover plate 440 so that the outer surfaces 420-1, 440-1 of the first and second cover plates 420, 440 are flush with each other.

Figure 14A:
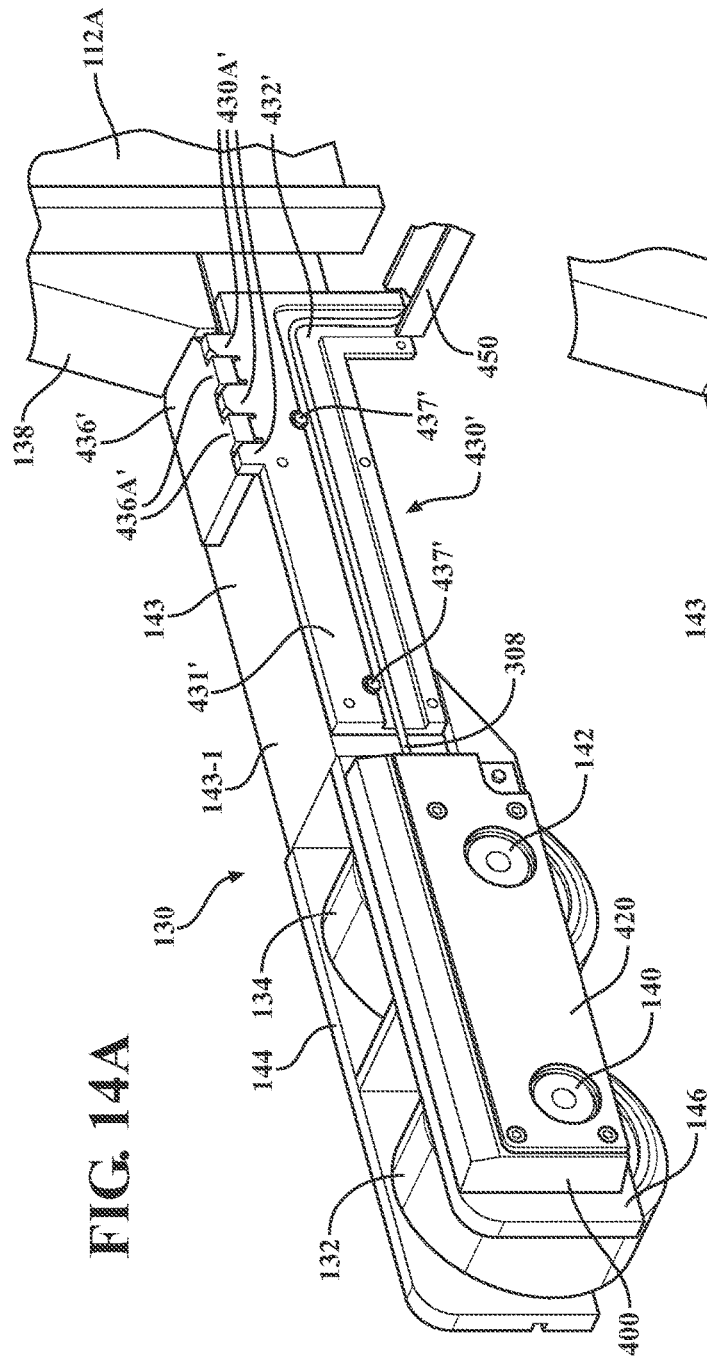
FIG. 14A is a detailed perspective view of one outrigger arm assembly, in accordance with the principles of the present disclosure.
Figure 14B:
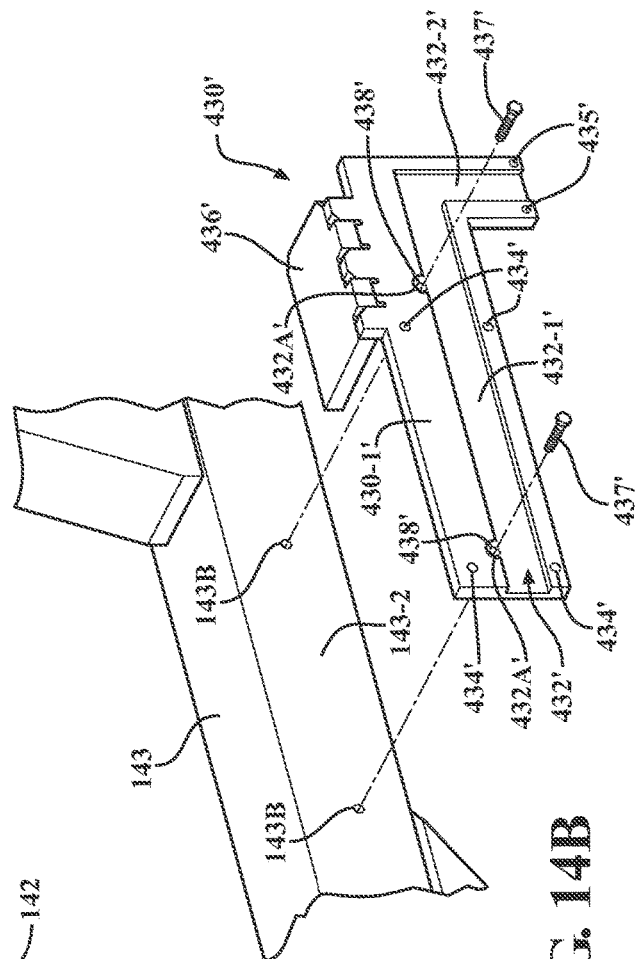
FIG. 14B is a detailed exploded view of the outrigger arm assembly of FIG. 14A.

An alternative configuration of the second side member 430' is depicted in FIGS. 14A and 14B. The outrigger arm assembly 130 depicted in FIGS. 14A and 14B may be substantially similar in structure to the outrigger arm assembly 130 depicted in FIGS. 4, 5, 7, and 8. Some components are removed and labeling of some components is eliminated in FIGS. 14A and 14B to illustrate other aspects of the invention in detail. The outrigger arm assembly 130 comprises a first side member 400 coupled to an axle plate 146, a first cover plate 420 coupled to the first side member 400, and a second side member 430' coupled to the support structure 143 adjacent to the first side member 400. A second cover plate (not shown; see reference numeral 440 in FIGS. 9 and 11A) may be coupled to the second side member 430' as described herein. A cable guide member 450 extends between the support structure 143 and a support member (not labeled; see reference numeral 116 in FIGS. 9 and 10).

As described in detail herein, the first side member 400 receives a sensor device 300, and the first and second side members 400, 430' and the cable guide member 450 receive a cable 308 extending from the sensor device 300 toward the mast assembly 110. The side members 400, 430' protect the cable 308 and may isolate the cable 308 from contact with the axle plate 146 and the support structure 143. With reference to FIGS. 14A and 14B, the second side member 430' comprises a second cable guide 432' that receives the cable 308 extending from the first side member 400. The second cable guide 432' may comprise a channel that is formed in an outer surface 430-1' of the second side member 430'. The second cable guide 432' may comprise a first section 432-1' that extends along a longitudinal length of the support structure 143, and a second section 432-2' that extends substantially perpendicular to the first section 432-1' and extends substantially below the support structure 143. The second side member 430' may be coupled to the support structure 143 via fasteners 437', which extend through apertures 438' formed in the second side member 430' and are received in corresponding blind or tapped bores 143B formed in a sidewall 143-2 of the support structure 143. In particular, the first section 432-1' of the second cable guide 432' may comprise cutouts 432A' extending above or below the second cable guide 432', and the apertures 438' may be formed in the cutouts 432A' so that the fasteners 437' do not interfere with the cable 308. The fasteners 437' may comprise screws, bolts, or other suitable fasteners.

As shown in FIG. 14A, the second side member 430' may comprise two separate portions including a main body 431', which comprises the second cable guide 432', and a flange 436'. The main body 431' of the second side member 430' extends along the sidewall 143-2 of the support structure 143. The flange 436' is located on an upper surface 143-1 of the support structure 143 and is substantially perpendicular to the main body 431' of the second side member 430'. The second side member 430' may comprise a plurality of teeth 430A' that interlock or mesh with a plurality of corresponding teeth 436A' formed on the flange 436'. The flange 436' may be welded or otherwise fixedly coupled to the upper surface 143-1 of the support structure 143. The main body 431' of the second side member 430' and the flange 436' may be welded or otherwise fixedly coupled to each other at a joint formed by the teeth 430A', 436A', and the main body 431' may be coupled to the sidewall 143-2 of the support structure 143 via the fasteners 437'. As seen in FIG. 14A, the flange 436' may abut the torque arm 138, and the interlocking of the teeth 430A', 436A' may assist with proper positioning of the main body 431' of the second side member 430'. Thus, the apertures 438' formed in the second cable guide 432' may serve as a drill guide for forming the bores 143B in the sidewall 143-2 of the support structure 143, particularly for purposes of retrofitting existing vehicles with sensor devices 300. As described herein, the second cover plate (not shown; see FIG. 9) may be coupled to the outer surface 430-1' of the second side member 430', e.g., via fasteners (not shown; see FIG. 9) received in apertures 434' formed in the second side member 430'.

With reference to FIGS. 10, 11B, and 14A, the cable guide member 450 comprises a third cable guide 452 that receives the portion of the cable 308 extending from the second side member 430, 430'. The cable guide member 450 may be coupled at one end to a portion of the second side member 430, 430' that extends below the support structure 143, e.g., the second section 432-2, 432-2' of the second cable guide 432, 432'. In particular, as shown in FIG. 11B, the cable guide member 450 comprises a flange 454 with apertures 456 formed through a thickness of the flange 454. Fasteners 458, which may comprise screws, bolts, or other suitable fasteners, extend through the apertures 456 in the flange 454 and are received in corresponding apertures 435, 435' formed in the second side member 430, 430', as shown in FIGS. 11B and 14B. In some examples, the cable guide member 450 may comprise a substantially U-shaped structure defining the third cable guide 452. The cable guide member 450 extends from the second side member 430, 430' to the support member 116, which is located between the outrigger arm assemblies 130, 150 and is coupled to the transverse plate 114 (see FIG. 10). The support member 116 may comprise, for example, a bracket with an opening 116A formed in it. The cable guide member 450 may be coupled at its other end to the support member 116 via one or more fasteners (not labeled). The cable 308 extends from the cable guide member 450 toward the power unit (not shown; see reference numerals 102 and 202 in FIGS. 1-3) of the vehicle, where the cable 308 may join a cable harness (not shown) supported on the support member 116 and comprising one or more cables or wires coupled to a power supply 320 and a signal processor 324, as described herein.

With reference to FIGS. 11A and 11B, the first side member 400 may be mounted onto the axle plate 146 by inserting the first ends 140A, 142A of the axles 140, 142 through the respective openings 400A, 400B of the first side member 400 and securing the axles 140, 142 to the axle plate 144 as described herein. The second side member 430 is coupled to the support structure 143 via the fasteners 437. The cable guide member 450 is coupled at one end to the second side member 430 via the fasteners 458 and at the other end to the support member 116. The sensor device 300 may then be inserted into the opening 404 formed in the first side member 400 and coupled to the axle plate 146 via the fastener 306 such that the portion 300B of the housing 302 of the sensor device 300 extends through the bore 147 formed in the axle plate 146. The cable 308 is placed in the first, second, and third cable guides 408, 432, 452 respectively formed in the first side member 400, the second side member 430, and the cable guide member 450. The first cover plate 420 is coupled to the first side member 400 over the sensor device 300 and the cable 308 by inserting fasteners 426 through apertures 424 formed in the first cover plate 420. The fasteners 426, which may comprise screws, bolts, or other suitable fasteners, are received in corresponding apertures 402 formed in the first side member 400. The second cover plate 440 is coupled to the second side member 430 over the cable 308 by inserting fasteners 442 through apertures 444 formed in the second cover plate 440. The fasteners 442, which may comprise screws, bolts, or other suitable fasteners, are received in corresponding apertures 434 formed in the second side member 430. In some examples, the second cover plate 440 may also be coupled to the first side member 400 via the extension 446. A fastener 447, which may comprise a screw, a bolt, or other suitable type of fastener, is inserted through an aperture 448 formed in the extension 446, and the fastener 447 is received in a corresponding aperture 410 formed in the second recessed portion 414 of the first side member 400. The axles 140, 142, the first side member 400, the first cover plate 420, the second side member 430', and the second cover plate (not shown) in FIGS. 14A and 14B may be assembled in a similar manner.

The axles 140, 142 may be removed and/or replaced after the installation of the side members 400, 430, 430', sensor device 300, and cover plates 420, 440 without disturbing the sensor device 300 or requiring removal of the first side member 400 or the first cover plate 420. Because the diameter of the openings 420A, 420B in the first cover plate 420 is larger than the diameter of any portion of the axles 140, 142, the axles 140, 142 may be accessed and inserted or removed through the openings 420A, 420B of the installed first cover plate 420 and through the openings 400A, 400B of the installed first side member 400. The axles 140, 142 may then be secured to the axle plate 144 as described herein.

Typically, the axles 140, 142 would be removed one at a time so that one axle 140, 142 remains in place, which keeps the first side member 400 and the first cover plate 420 in place. In addition, the coupling of the second cover plate 440 to the first side member 400 via the extension 446 serves as a second attachment point between the frame member 136 and the first side member 400 and the first cover plate 420, which helps to prevent unwanted pivoting of the first side member 400 and/or the first cover plate 420 following removal of one of the axles 140, 142. The sensor device 300 may be accessed by removing one or both of the cover plates 420, 440 without the need to remove the side members 400, 430, 430' or the axles 140, 142.

Figure 15:
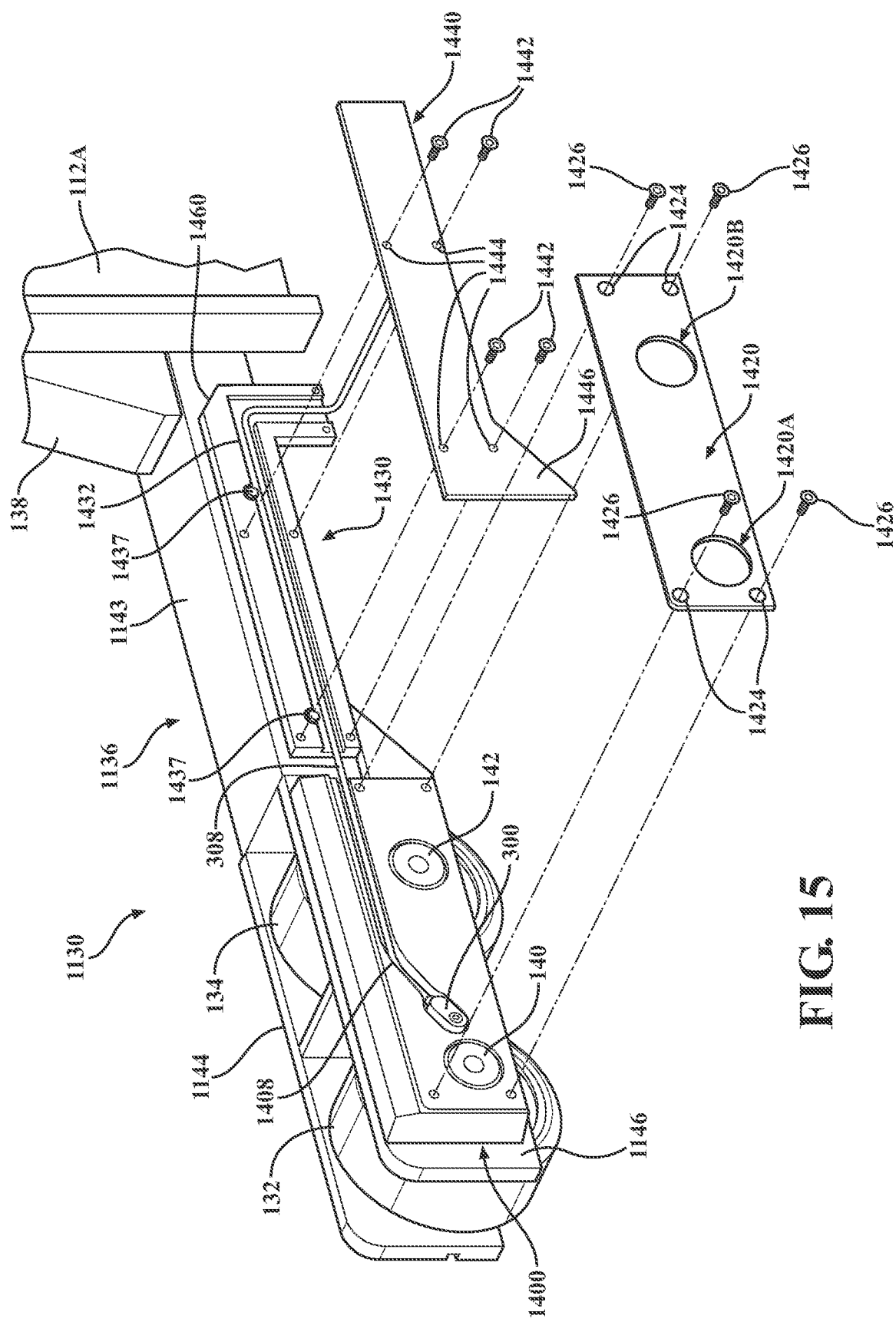
FIG. 15 is a partially exploded view of one outrigger arm assembly, in accordance with the principles of the present disclosure.

An alternative configuration of an outrigger arm assembly 1130 is depicted in FIG. 15. Unless otherwise noted, the outrigger arm assembly 1130 depicted in FIG. 15 may be substantially similar in structure to the outrigger arm assembly 130 described herein. Some components are removed and labeling of some components is eliminated in FIG. 15 to illustrate other aspects of the invention in detail. The outrigger arm assembly 1130 comprises a frame member 1136 comprising a support structure 1143 and a pair of axle plates 1144, 1146; a first side member 1400 coupled to the axle plate 1146; a first cover plate 1420 coupled to the first side member 1400; a second side member 1430 coupled to the support structure 1143 adjacent to the first side member 1400; and a second cover plate 1440 coupled to the second side member 1430.

The first side member 1400 in FIG. 15 may comprise openings (not labeled) that receive axles 140, 142. The axles 140, 142 may be fixed to the axle plates 1144, 1146, and the first side member 1400 may be coupled to the axle plate 1146 via the axles 140, 142, as described herein. Wheels 132, 134 may be rotatably mounted to and supported on a respective one of the axles 140, 142, and a code ring (not shown) may be fixed to, for example, the wheel 132, as described herein. The second side member 1430 in FIG. 15 may be coupled to the support structure 1143 via fasteners 1437, which may comprise screws, bolts, or other suitable fasteners. Unlike the second side members 430, 430' in FIGS. 11A and 14A, the second side member 1430 in FIG. 15 does not include a flange extending over an outer surface (not labeled) of the support structure 1143. In addition, the second side member 1430 comprises a chamfer 1460 to allow clearance for adjacent components and/or structures. For example, the chamfer 1460 may provide clearance for the weld between the mast rail 112A and the torque arm 138 so that the second side member 1430 does not contact the weld and fits flush against a sidewall (not labeled) of the support structure 1143.

The first side member 1400 receives a sensor device 300 and comprises a first cable guide 1408 that receives a cable 308 extending from the sensor device 300. The second side member 1430 comprises a second cable guide 1432, which receives the cable 308 extending from the first side member 1400. A cable guide member (not shown; see reference numeral 450 in FIGS. 9 and 10) extends between the support structure 1143 and a support member (not labeled; see reference numeral 116 in FIGS. 9 and 10) and receives the cable 308 extending from the second side member 1430.

With continued reference to FIG. 15, the first cover plate 1420 is coupled to the first side member 1400 over the sensor device 300 and the cable 308 by inserting fasteners 1426 through apertures 1424 formed in the first cover plate 1420. The second cover plate 1440 is coupled to the second side member 1430 over the cable 308 by inserting fasteners 1442 through apertures 1444 formed in the second cover plate 1440. The fasteners 1426, 1442 may comprise screws, bolts, or other suitable fasteners and are received in corresponding apertures (not labeled) formed in a respective one of the first or second side member 1400, 1430.

Similar to the first cover plates 420, 420' in FIGS. 11A and 14A, the first cover plate 1420 in FIG. 15 may comprise openings 1420A, 1420B extending through a thickness of the first cover plate 1420 that allow the axles 140, 142 to be inserted and removed without removing the first cover plate 1420, as described herein. The first side member 1400 may comprise a recessed portion (not labeled) that is designed to receive the first cover plate 1420. Unlike the first cover plates 420, 420', the first cover plate 1420 is substantially rectangular and lacks a notch. The second cover plate 1440 may extend across a gap between the first and second side members 1400, 1430 and may abut the first cover plate 1420 to cover the exposed portion of the cable 308. The second cover plate 1440 may optionally comprise an extension 1446 that extends from a corner of the second cover plate 1440. Unlike the extension 446 on the second cover plate 1440 in FIG. 11A, the extension 1446 in FIG. 15 is not attached to the first side member 1400. In addition, because the first cover plate 1420 is substantially rectangular, the extension 1446 projects downward and does not extend toward the first cover plate 1420. The extension 1446 may substantially correspond to a shape of an adjacent portion of the support structure 1143 and the axle plate 1146. As described herein, a thickness of the side members 1400, 1430, a depth of the recessed portion formed in the first side member 1400, and/or a thickness of the cover plates 1420, 1440 may be varied, such that respective outer surfaces (not labeled) of the cover plates 1420, 1440 are flush with each other, such that the outer surfaces of the cover plates 1420, 1440 form a substantially continuous surface extending from a forward end of the outrigger arm assembly 1130 toward the mast assembly 110 (see FIG. 9).

In all examples described herein, the sensor device 300 is located adjacent to the wheel 132, and more specifically to the code ring 190, to sense movement of the code ring 190 and generate an output signal indicative of movement of the wheel 132, as described herein. As shown in FIGS. 5, 7, 8, 11A, 12, and 13, the sensor device 300 is located such that the portion 300B extending through the axle plate 146 is adjacent to and aligned with the code ring 190 located within the wheel recess 137 of the wheel 132. An air gap G is defined between the code ring 190 and the outermost surface of the portion 300B of the housing 302 of the sensor device 300 extending through the axle plate 146, as shown in FIG. 8. The air gap G may comprise, for example, about 0.05 inches to about 0.25 inches.

The sensor device 300 may comprise one or more sensors or switches for sensing the magnetic fields generated by the alternating N and S poles of the code ring 190 and generating a corresponding output signal 326 that is indicative of movement of the wheel 132. In some examples, the sensor device 300 may comprise a single Hall-effect sensor, e.g., a bipolar Hall-effect sensor. In other examples, the sensor device 300 may comprise two or more Hall-effect sensors. In some particular examples, the sensor device 300 may comprise a dual-channel sensor (e.g., Channel A and Channel B) comprising two Hall-effect sensors that are contained within the same housing 302. The one or more Hall-effect sensors may be located in the portion 300B of the housing 302 of the sensor device 300 that extends through the axle plate 146. In particular, the sensing elements located in the portion 300B of the housing 302 of the sensor device 300 may comprise the one or more Hall-effect sensors and circuitry to detect the magnetic fields generated by the code ring 190. A dual-channel sensor (e.g., Channel A and Channel B) comprising two Hall-effect sensors is commercially available from Phoenix America, Inc. (Fort Wayne, Ind.).

With reference to FIGS. 5 and 10, the sensor device 300 is coupled to a power supply 320 located on the power unit 102, 202 that provides an input voltage signal 322 such as a regulated input voltage. As the wheel 132 rotates, the code ring 190 located within the wheel recess 137 also rotates. A voltage of the output signal 326 generated by the sensor device 300 changes based on whether a N or a S pole is passing by the portion 300B of the housing 302 of the sensor device 300 extending through the axle plate 146 adjacent to the code ring 190. A signal processor 324, located on the power unit 102, 202, receives the output signal(s) 326 from the sensor device 300 in the form of one or more square wave signals. The power supply 320 and signal processor 324 may be positioned in separate locations or may comprise a single module. In the case of a sensor device 300 with one Hall-effect sensor, a rotational speed of the wheel 132 may be determined by the signal processor 324 based on the number of cycles or pulses in the output signal 326 counted per sampling period, e.g., the number of North or South poles counted per unit time or the number of both North and South poles counted per unit time. In the case of a sensor device 300 with two Hall-effect sensors, the output signals 326, e.g., signals A and B, are phase shifted by 90 degrees from each other, i.e., 90 degrees out of phase with one another, to generate a quadrature output. The quadrature output may be used by the signal processor 324 to determine the rotational speed of the wheel 132 as described above, i.e., based on the number of cycles or pulses in the output signal from one of the Hall-effect sensors counted per sampling period, and, further, using the relative phase of the output signals 326 produced by the two channels, a direction of rotation of the code ring 190 may be determined based on which signal (i.e., signal A or signal B) is leading the other. Acceleration values may be calculated by the signal processor 324 by taking derivatives of the speed values.

The signal processor 324 may comprise any control module on the vehicle 100, 200. In some examples, the signal processor 324 comprises an RFID module that may be used in conjunction with one or more geolocation-based assistance and control features. For example, tags or other markers located in or on the floor surface F or other structure may designate various zones, such as zones with speed and/or lift height restrictions and/or an auto-hoist zone in which an Automatic Positioning System automatically lowers or raises the forks 122, 222 to a desired height based on the location of the vehicle 100, 200 with respect to a pick location. The signal processor 324 comprising the RFID module may use the output signal 326 of the sensor device 300, in conjunction with a tag reader (not shown), to determine a current speed and location of the vehicle 100, 200 within a workspace. In all examples, the signal processor 324 may be communicatively coupled to a controller area network (CAN) bus and may provide information to other controllers in the vehicle 100, 200.

Alternatively, or in addition, the other outrigger arm assembly 150 (see FIGS. 4, 9, and 10) may comprise a sensor device that is substantially similar to the sensor device 300 described herein with respect to the outrigger arm assembly 130 and 1130. For example, a sensor device (not shown) may be coupled to an outer surface (not separately labeled) of the inner axle plate 164 adjacent to the wheel 152, and the wheel 152 may comprise a code ring located in a wheel recess. One or more side members (not shown) may be coupled to an outer surface (not visible) of the axle plate 164 to enclose and/or support the sensor device. In general, the sensor device(s) 300 and code ring(s) 190 will be located in conjunction with the outer or forward wheel(s), e.g., wheels 132 and/or 152. The inner wheels 134, 154 may lose contact with the floor surface F due, for example, to a heavy load on the forks 122, 222 or an uneven floor surface, which may cause inaccurate readings.

In configurations in which two or more sensor devices 300 are present in a single vehicle 100, 200, each sensor device 300 may serve as a check on the other sensor device(s) 300. For example, the speeds calculated based on the respective output signals of the sensor devices 300 may be compared, and if a difference between the calculated speeds exceeds a predetermined threshold, one or more of the sensor devices 300 may be malfunctioning. In other configurations, the vehicle 100, 200 may comprise an encoder (not shown) that is coupled to a traction motor shaft (not shown) and that generates signals indicative of the speed, acceleration, and/or direction of rotation of the traction motor. If a difference in the calculated speed, acceleration, and/or direction of rotation exceeds a predetermined threshold, there may be a malfunction. In some examples, an error message may be displayed to an operator of the vehicle 100, 200. In other examples, one or more functions of the vehicle 100, 200 may be restricted or disabled. For example, the speed of the vehicle may be restricted and/or the fork lowering/raising function may be restricted or disabled.

The presently disclosed sensor device 300 provides a number of benefits and advantages over existing devices and systems for determining the speed of a vehicle based on a rotational speed of the wheel or other component of the vehicle. For example, many existing systems utilize a sensor associated with a complex bearing assembly that adds weight and is subject to a significant amount of wear. A significant amount of time and labor is typically required to disassemble and reassemble the bearing assembly to access the sensor and to repair or replace components of the bearing assembly. Further, when the bearing assembly is replaced because of bearing wear, the sensor, which can be relatively expensive, must be replaced as well when the sensor is formed as part of the bearing assembly.

The sensor device 300 in accordance with the present disclosure is small and can be accessed by removing either the side member 180 in the configuration depicted in FIGS. 4, 5, 7, and 8 or the cover plates 420, 440 in the configuration depicted in FIGS. 9-13 (see also FIGS. 14A and 15). The sensor device 300 is located such that components that wear out quickly, e.g., the wheel bearings 133A, 133B, 135A, 135B, the wheel covers 132B, 134B (which typically results in the wheels 132, 134 being replaced), and/or the axles 140, 142, may be repaired or replaced without disturbing or replacing the sensor device 300. The code ring 190, which is relatively inexpensive, may be replaced frequently, e.g., each time the wheels 132, 134 and/or axles 140, 142 are replaced. The bores 143A, 143B, 147, 149 drilled into and/or through the support structure 143 and the axle plate 146 have a small enough diameter that the structural integrity of the support structure 143 and the axle plate 146 remains substantially unchanged, and the location of the sensor device 300 and bores 143A, 143B, 147, 149 allows existing vehicles to be retrofitted relatively easily, particularly when used in conjunction with a side member 180 comprising auxiliary bores 186, as shown in FIG. 5, or a second side member 430, 430' comprising apertures 438, 438', as shown in FIGS. 11A and 14B, that may serve as drill guides.

In addition, conventional, bearing-style sensor systems must typically conform to very tight tolerances in order to provide accurate readings. Rather than directly detecting the rotational speed of the wheel, the sensor incorporated into a bearing assembly generally monitors the speed of a ring that is coupled to an inner, rotating portion of the bearing. Typically, the axle is press-fitted tightly within the inner rotating portion of the bearing to prevent the axle from slipping relative to the inner portion of the bearing. A wheel is fixed to the axle so as to rotate with the axle. If there is any slippage or rotation between the axle and the inner portion of the bearing, the wheel speed provided by the sensor will not be accurate as the sensed ring will rotate at a different rate from the axle and the wheel. As a result, sensor/bearing assemblies typically must be precisely machined and press-fitted tightly onto the axle to ensure that the axle does not slip relative to the inner portion of the bearing, i.e., so that the axle rotates at the same rate as the bearing inner portion and the ring. However, effecting a very tight press fit between an axle and a bearing to ensure no rotation between the axle and the bearing is more involved, e.g., takes more time and requires tighter tolerances. In the present invention, because some slight rotation between the axle 140 and the wheel bearings 133A, 133B will not affect the accuracy of the readings provided by the sensor device 300, the wheel bearings 133A, 133B do not have to be tightly mounted to the axle 140, making replacement of the wheel 132 in the field easier and more efficient.

In the prior art, press-fitting also ensures that the air gap between the sensor and the ring is maintained at the precise and consistent value required to achieve accurate readings. A tightly controlled and consistent air gap is particularly critical for gear-tooth or proximity sensors, and any increase in the air gap size generally requires an increase in sensor size.

In contrast, the presently disclosed sensor device 300 directly monitors the wheel speed, such that inconsistent rotation or slippage of the axle 140 relative to the wheel bearings 133A, 133B does not affect the accuracy of the readings provided by the sensor device 300. Because the wheel speed is directly monitored, the wheel may be a driven wheel or a non-driven wheel as described herein, which does not involve a rotating axle. The presently disclosed sensor device 300 provides similar advantages over conventional sensor devices that determine the vehicle speed based on a rotational speed or position of another component of the vehicle, such as the shaft of the traction motor. In particular, encoders that monitor a speed and position of the traction motor shaft may provide inaccurate readings of an actual vehicle speed, particularly when driven wheel slip is occurring. Because the presently disclosed sensor device 300 directly monitors the wheel speed of a non-driven wheel, the actual vehicle speed may be more accurately determined.

The presently disclosed sensor device 300 is also less likely to be affected by the high degree of variability in the air gap created by differences and/or inconsistencies in the structure and dimensions of the outrigger arm assemblies 130, 150. For example, Hall-effect sensors, in combination with a magnetic target (e.g., the code ring 190) are much more sensitive and are typically effective over a much wider air gap range, as compared to, for example, an inductive proximity sensor or a back biased Hall sensor. As a result, the presently disclosed sensor device 300 may be a more robust solution and may be more quickly assembled by hand.

Having thus described the invention of the present application in detail and by reference to embodiments thereof, it will be apparent that modifications and variations are possible without departing from the scope of the invention defined in the appended claims.

What is claimed is:

1. A wheel assembly including a sensor for measuring wheel movement comprising:
a frame member;
an axle fixed to the frame member;
a wheel rotatably mounted to the axle, wherein the wheel comprises a wheel recess;
a code ring located within the wheel recess for rotation with the wheel; and
a sensor device coupled to the frame member and located adjacent to the code ring, wherein the sensor device senses movement of the code ring and generates an output signal indicative of the wheel movement, and wherein:
the frame member comprises opposing axle plates for supporting the axle, each of the opposing axle plates comprising a bore formed therethrough for receiving the axle;
one of the opposing axle plates comprises a further bore through which a portion of the sensor device at least partially extends; and
the wheel assembly further comprises a side member that is coupled to an outer surface of the one axle plate and is configured to receive the sensor device.

2. The wheel assembly as set out in claim 1, wherein the code ring comprises a ring magnetized with alternating north and south poles around a perimeter of the ring.

3. The wheel assembly as set out in claim 2, wherein the sensor device comprises at least one Hall-effect sensor for sensing the alternating north and south poles as the code ring rotates and, based on sensing the alternating north and south poles, generating the output signal.

4. The wheel assembly as set out in claim 3, wherein the sensor device comprises first and second Hall-effect sensors that generate first and second output signals that are 90 degrees out of phase with one another.

5. The wheel assembly as set out in claim 1, wherein the portion of the sensor device extends completely through a thickness of the one axle plate and is aligned with the code ring.

6. The wheel assembly as set out in claim 1, wherein the sensor device comprises a housing with a housing bore extending through the housing and a fastener that extends through the housing bore and engages a tapped bore in the one axle plate.

7. The wheel assembly as set out in claim 1, further comprising a cover plate coupled to an outer surface of the side member.

8. The wheel assembly as set out in claim 1, further comprising a cable guide member extending between the frame member and a support member.

9. The wheel assembly as set out in claim 1, wherein the side member coupled to the one axle plate comprises a first side member and wherein the frame member comprises a support structure, the wheel assembly further comprising:
a second side member coupled to the support structure and located adjacent to the first side member;
a first cover plate coupled to an outer surface of the first side member; and
a second cover plate coupled to an outer surface of the second side member,
wherein the first side member is further configured to receive a cable extending from the sensor device and the second side member is configured to receive the cable extending from the first side member.

10. The wheel assembly as set out in claim 9, wherein the second side member comprises one or more apertures extending through a thickness of the second side member and one or more fasteners that extend through the one or more apertures and engage one or more corresponding bores formed in one of an outer surface or a sidewall of the support structure.

11. The wheel assembly as set out in claim 10, wherein the one or more apertures serve as a drill guide for forming the one or more corresponding bores in the support structure.

12. The wheel assembly as set out in claim 1, wherein:
the sensor device comprises a housing with a housing bore extending through the housing and a fastener that extends through the housing bore and engages an additional bore in the one axle plate; and
the side member further comprises one or more auxiliary bores that serve as a drill guide for forming one or more of the further bore or the additional bore.

13. A materials handling vehicle comprising:
a power unit;
a mast assembly secured to the power unit;
a pair of forks coupled to the mast assembly, the forks being movable in height between a lowered position and a plurality of raised positions; and
a pair of outrigger arm assemblies secured to the mast assembly, each outrigger arm assembly comprising:
a frame member secured to the mast assembly;
an axle fixed to the frame member;
a wheel rotatably mounted to the axle, wherein the wheel comprises a wheel recess;
a code ring located within the wheel recess for rotation with the wheel; and
a sensor device coupled to the frame member and located adjacent to the code ring, wherein the sensor device senses movement of the code ring and generates an output signal indicative of movement of the wheel, and wherein:
the frame member comprises opposing axle plates for supporting the axle, each of the opposing axle plates comprising a bore formed therethrough for receiving the axle;
one of the opposing axle plates comprises a further bore through which a portion of the sensor device at least partially extends; and
the outrigger assembly further comprises a side member that is coupled to an outer surface of the one axle plate and is configured to receive the sensor device.

14. The materials handling vehicle as set out in claim 13, wherein the code ring comprises a ring magnetized with alternating north and south poles around a perimeter of the ring.

15. The materials handling vehicle as set out in claim 14, wherein the sensor device comprises at least one Hall-effect sensor for sensing the alternating north and south poles as the code ring rotates and, based on sensing the alternating north and south poles, generating the output signal.

16. The materials handling vehicle as set out in claim 15, wherein the sensor device comprises first and second Hall-effect sensors that generate first and second output signals that are 90 degrees out of phase with one another.

17. The materials handling vehicle as set out in claim 13, further comprising a cover plate coupled to an outer surface of the side member.

18. The materials handling vehicle as set out in claim 13, further comprising a cable guide member extending between the frame member and a support member.

19. The materials handling vehicle as set out in claim 13, wherein the side member coupled to the one axle plate comprises a first side member and wherein the frame member comprises a support structure, the materials handling vehicle further comprising:

a second side member coupled to the support structure and located adjacent to the first side member;

a first cover plate coupled to an outer surface of the first side member; and a second cover plate coupled to an outer surface of the second side member, wherein the first side member is further configured to receive a cable extending from the sensor device and the second side member is configured to receive the cable extending from the first side member.

20. The materials handling vehicle as set out in claim 19, wherein the second side member comprises one or more apertures extending through a thickness of the second side member and one or more fasteners that extend through the one or more apertures and engage one or more corresponding bores formed in one of an outer surface or a sidewall of the support structure.

21. The materials handling vehicle as set out in claim 20, wherein the one or more apertures serve as a drill guide for forming the one or more corresponding bores in the support structure.

22. The materials handling vehicle as set out in claim 13, wherein:

the sensor device comprises a housing with a housing bore extending through the housing and a fastener that extends through the housing bore and engages a tapped bore in the one axle plate; and the side member further comprises one or more auxiliary bores that serve as a drill guide for forming one or more of the further bores or the tapped bore.

23. The materials handling vehicle as set out in claim 13, wherein the portion of the sensor device extends completely through a thickness of the one axle plate and is aligned with the code ring.

24. The materials handling vehicle as set out in claim 13, wherein the sensor device comprises a housing with a housing bore extending through the housing and a fastener that extends through the housing bore and engages a tapped bore in the one axle plate.

\* \* \* \* \*